US011146730B2

(12) United States Patent
Aoki

(10) Patent No.: US 11,146,730 B2
(45) Date of Patent: Oct. 12, 2021

(54) IMAGING DEVICE, FINDER DEVICE, METHOD OF CONTROLLING IMAGING DEVICE, METHOD OF CONTROLLING FINDER DEVICE, CONTROL PROGRAM FOR IMAGING DEVICE, AND CONTROL PROGRAM FOR FINDER DEVICE

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/861,708

(22) Filed: Apr. 29, 2020

(65) Prior Publication Data

US 2020/0259983 A1 Aug. 13, 2020

Related U.S. Application Data

(63) Continuation of application No. PCT/JP2018/039708, filed on Oct. 25, 2018.

(30) Foreign Application Priority Data

Oct. 30, 2017 (JP) ............................ JP2017-209215

(51) Int. Cl.
*H04N 5/232* (2006.01)

(52) U.S. Cl.
CPC ....... *H04N 5/2327* (2013.01); *H04N 5/23254* (2013.01); *H04N 5/23296* (2013.01); *H04N 5/232939* (2018.08)

(58) Field of Classification Search
CPC ........... H04N 5/2327; H04N 5/232939; H04N 5/23254; H04N 5/23296; H04N 5/232127;

(Continued)

(56) References Cited

U.S. PATENT DOCUMENTS

2006/0034603 A1* 2/2006 Homma .............. G02F 1/13342 396/296
2008/0218596 A1 9/2008 Hoshino (Continued)

FOREIGN PATENT DOCUMENTS

JP 2005-37843 A 2/2005
JP 2005-201997 A 7/2005

(Continued)

OTHER PUBLICATIONS

International Preliminary Report on Patentability and Written Opinion of the International Searching Authority dated Jun. 19, 2019, for International Application No. PCT/JP2018/039708, with an English Translation.

(Continued)

*Primary Examiner* — Gevell V Selby
(74) *Attorney, Agent, or Firm* — Birch, Stewart, Kolasch & Birch, LLP

(57) ABSTRACT

Provided are an imaging device, a finder device, a method of controlling an imaging device, a method of controlling a finder device, a control program for an imaging device, and a control program for a finder device capable of preventing burn-in of a display device that displays display information on an optical image of a subject observed through an optical finder in a superimposed manner, and preventing a relative positional relationship between a position of the display information displayed on the display device and a range, in which imaging is actually performed, from being changed. Display information, such as a visual-field frame, displayed at a prescribed position of an OLED display (218) is moved on the OLED display (218), and burn-in of the OLED display (218) is prevented. An imaging range of an image sensor (201) is moved corresponding to movement of the display information, and a relative positional relationship between a position of the display information displayed on (Continued)

the optical image of the subject observed through the optical finder in a superimposed manner and a range to be actually imaged is prevented from being changed.

18 Claims, 13 Drawing Sheets

(58) Field of Classification Search
CPC ......... H04N 5/23287; H04N 5/232122; H04N 5/23258; H04N 5/225; G03B 5/00; G03B 5/08; G03B 13/06; G03B 17/20
See application file for complete search history.

(56) References Cited

U.S. PATENT DOCUMENTS

2014/0211069 A1* 7/2014 Koguchi ............ H04N 5/23212 348/333.09
2016/0165111 A1* 6/2016 Uemura ............. H04N 5/23209 348/208.11
2016/0269606 A1* 9/2016 Numako .............. H04N 5/2353
2019/0041725 A1* 2/2019 Murayama ............. G03B 13/02

FOREIGN PATENT DOCUMENTS

| | | | |
|---|---|---|---|
| JP | 2008-219696 | A | 9/2008 |
| JP | 2012-85261 | A | 4/2012 |
| JP | 2015-233255 | A | 12/2015 |
| WO | WO 2015/025878 | A1 | 2/2015 |

OTHER PUBLICATIONS

International Search Report, dated Jan. 15, 2019, for International Application No. PCT/JP2018/039708, with an English translation.

* cited by examiner

IMAGING DEVICE, FINDER DEVICE, METHOD OF CONTROLLING IMAGING DEVICE, METHOD OF CONTROLLING FINDER DEVICE, CONTROL PROGRAM FOR IMAGING DEVICE, AND CONTROL PROGRAM FOR FINDER DEVICE

CROSS-REFERENCE TO RELATED APPLICATIONS

The present application is a Continuation of PCT International Application No. PCT/JP2018/039708 filed on Oct. 25, 2018 claiming priority under 35 U.S.C. § 119(a) to Japanese Patent Application No. 2017-209215 filed on Oct. 30, 2017. Each of the above applications is hereby expressly incorporated by reference, in its entirety, into the present application.

BACKGROUND OF THE INVENTION

1. Field of the Invention

The present invention relates to an imaging device, a finder device, a method of controlling an imaging device, a method of controlling a finder device, a control program for an imaging device, and a control program for a finder device, and in particular, to a technique for preventing burn-in of a display device to be used in a finder device.

2. Description of the Related Art

In the related art, a finder device in which a frame (bright frame) indicating an imaging range displayed on a display unit and display information, such as subject distance information, can be displayed on an optical image of a subject observed through an optical finder in a superimposed manner using a half mirror is known (JP2012-085261A).

In a camera comprising a self-luminous display, such as an organic electro luminescence (EL) display, a technique for suppressing burn-in of the self-luminous display has been suggested (JP2005-037843A).

The camera described in JP2005-037843A uses an organic EL display as a display provided on a rear surface of the camera, displays a captured live view image on the organic EL display, and displays various icons for notifying a user of a current state of the camera in a peripheral portion of the display screen and a reference window for autofocus (focus frame) at the center of the screen in a superimposed manner.

The camera described in JP2005-037843A displays various icons originally displayed at fixed positions of the display screen and display information, such as the focus frame, while changing the positions of various icons and the display information, such as the focus frame, by such a small amount as undetectable by the user with a naked eye in order to suppress burn-in of the organic EL display. Specifically, the display information is displayed while sequentially shifting the display information clockwise pixel by pixel in up, down, right, and left directions of the organic EL display to suppress burn-in.

SUMMARY OF THE INVENTION

A liquid crystal display device is exemplified as the display unit described in JP2012-085261A; however, in JP2012-085261A, there is no description showing the problem that pixels of a specific part (for example, a part continuously displayed with high brightness) of the screen of the display unit are deteriorated (so-called "burn-in" occurs) due to the display information displayed on the display unit.

On the other hand, the self-luminous display, such as an organic EL display, described in JP2005-037843A is a display that is provided on the rear surface of the camera, and is not a display that displays icons and display information, such as a focus frame, on an optical image of a subject observed through an optical finder in a superimposed manner using a half mirror.

The camera described in JP2005-037843A displays the display information, such as various icons and the focus frame originally displayed at the fixed positions of the display screen, while changing the positions of the display information by such a small amount as undetectable by the user with the naked eye in order to suppress burn-in of the organic EL display; however, for example, as described in JP2005-037843A in a case where the display information is displayed while sequentially shifting the display information clockwise pixel by pixel in the up, down, right, and left directions of the organic EL display, the shift amount is excessively small. For this reason, while the boundary of the display information is blurred, there are pixels that are constantly displayed, and there is a problem in that the pixels are deteriorated.

On the other hand, in a case where the display information is shifted beyond such a small amount as undetectable by the user with the naked eye, the display information (for example, a visual-field frame, a focus frame, or the like) that should be originally displayed at a prescribed position of the display device is shifted, and there is a problem in that an imaging range to be confirmed by the user through the visual-field frame and a range in which imaging is actually performed are shifted or a target for autofocus adjusted in the focus frame and a target to be actually autofocused are shifted.

The invention has been accomplished in view of such a situation, and an object of the invention is to provide an imaging device, a finder device, a method of controlling an imaging device, a method of controlling a finder device, a control program for an imaging device, and a control program for a finder device capable of suppressing burn-in of a display device (display) that displays display information on an optical image of a subject observed through an optical finder in a superimposed manner, and preventing a relative positional relationship between a position of display information displayed on the display device and a range, in which imaging is actually performed, from being changed.

In order to achieve the above-described object, an imaging device according to an aspect of the invention comprises an optical finder that observes an optical image of a subject, a display device (display), an optical element that is disposed in an optical path of the optical finder and superimposes the optical image of the subject observed through the optical finder and display information displayed on the display device, an image sensor on which the optical image of the subject is formed through an imaging optical system (lens system), a display controller (processor) that moves the display information displayed at a prescribed position of the display device on the display device, and an imaging range movement controller (processor) that moves an imaging range of the image sensor corresponding to an amount of movement of the display information moving on the display device.

According to the aspect of the invention, since the display information displayed at the prescribed position of the display device is moved on the display device, it is possible to prevent burn-in of the display device. Even though the display information is moved on the display device, since the imaging range of the image sensor is moved corresponding to the amount of movement of the display information, it is possible to prevent the relative positional relationship between the position of the display information displayed on the optical image of the subject observed through the optical finder in a superimposed manner and the range, in which imaging is actually performed, from being changed.

In the imaging device according to another aspect of the invention, it is preferable that the imaging range movement controller is a sensor movement controller that moves the image sensor in a direction perpendicular to an optical axis direction of the imaging optical system corresponding to the amount of movement of the display information moving on the display device and moves the imaging range of the image sensor.

According to another aspect of the invention, the image sensor itself is moved in the direction perpendicular to the optical axis direction of the imaging optical system corresponding to the amount of movement of the display information, whereby the relative positional relationship between the position of the display information displayed on the optical image of the subject observed through the optical finder in a superimposed manner and the range, in which imaging is actually performed, is prevented from being changed.

In the imaging device according to still another aspect of the invention, it is preferable that the imaging device further comprises a vibration-proof device (vibration corrector) that corrects an image shake, and the vibration-proof device includes the sensor movement controller. With this, it is possible to apply an existing vibration-proof device as a mechanism that moves the image sensor, and to constitute the device without adding new hardware.

In the imaging device according to still another aspect of the invention, it is preferable that the imaging range movement controller is an optical member movement controller that moves at least a part of optical members of the imaging optical system in a direction perpendicular to an optical axis direction of the imaging optical system corresponding to the amount of movement of the display information moving on the display device and moves the imaging range of the image sensor.

According to still another aspect of the invention, at least a part of optical members of the imaging optical system is moved in the direction perpendicular to the optical axis direction of the imaging optical system corresponding to the amount of movement of the display information, whereby the relative positional relationship between the position of the display information displayed on the optical image of the subject observed through the optical finder in a superimposed manner and the range, in which imaging is actually performed, is prevented from being changed.

In the imaging device according to still another aspect of the invention, it is preferable that the imaging device further comprises a vibration-proof device (vibration corrector) that corrects an image shake, and the vibration-proof device includes the optical member movement controller. With this, it is possible to apply an existing vibration-proof device as a mechanism that moves at least a part of optical members of the imaging optical system, and to constitute the device without adding new hardware.

In the imaging device according to still another aspect of the invention, it is preferable that the imaging range movement controller is an image cutout unit that controls a cutout position of an imaging pixel region to be cut out from an effective pixel region of the image sensor corresponding to the amount of movement of the display information moving on the display device and moves the imaging range of the image sensor.

According to still another aspect of the invention, the range (imaging range) to be actually imaged is moved and cut out from the effective pixel region of the image sensor corresponding to the amount of movement of the display information moving on the display device, whereby the relative positional relationship between the position of the display information displayed on the optical image of the subject observed through the optical finder in a superimposed manner and the range, in which imaging is actually performed, is prevented from being changed. In general, since the number of pixels of the effective pixel region of the image sensor is greater than the number of pixels of a captured image to be recorded, and there is a marginal portion that is not used in imaging, it is possible to the cutout position of the imaging pixel region using the marginal portion of the effective pixel region of the image sensor.

In the imaging device according to still another aspect of the invention, it is preferable that the display information displayed at the prescribed position of the display device includes at least one of a visual-field frame or a focus frame. This is because that the visual-field frame or the focus frame is the display information that should be displayed at the prescribed position of the display device.

A finder device according to still another aspect of the invention comprises an optical finder that observes an optical image of a subject, a display device (display), an optical element that is disposed in an optical path of the optical finder and superimposes the optical image of the subject observed through the optical finder and display information displayed on the display device, a display device movement controller (processor) that moves the display device within the same plane as a display surface of the display device, and a display controller (processor) that moves the display information on the display device and cancels movement of the display information with the movement of the display device.

According to still another aspect of the invention, the display device itself is moved within the same plane as the display surface of the display device, and the display information is moved on the display device corresponding to the movement of the display device, whereby the movement of the display information with the movement of the display device is cancelled. With this, it is possible to prevent burn-in of the display device, and to prevent the position of the display information displayed on the display device from moving with respect to the optical finder.

A finder device according to still another aspect of the invention comprises an optical finder that observes an optical image of a subject, a display device (display), an optical element that is disposed in an optical path of the optical finder and superimposes the optical image of the subject observed through the optical finder and display information displayed on the display device, an optical system for display that is disposed between the display device and the optical element, an optical magnification controller (processor) that moves the display device or the optical system for display in an optical axis direction of the optical system for display and changes an optical magnification of the display information viewed through an eyepiece unit of the optical finder, and a display magnification controller (processor) that changes a display magnification of the display information displayed on the display device and cancels change in the optical magnification of the display information.

According to still another aspect of the invention, the display device or the optical system for display is moved in the optical axis direction of the optical system for display, the optical magnification of the display information viewed through the eyepiece unit of the optical finder is changed, and the display magnification of the display information displayed on the display device is changed with the change in the optical magnification of the display information, whereby the change in the optical magnification of the display information is cancelled. With this, it is possible to prevent burn-in of the display device, and even though the size of the display information displayed on the display device is magnified or reduced (even though a display position is changed), it is possible to prevent the size of the display information viewed through the eyepiece unit of the optical finder from being changed.

In the finder device according to still another aspect of the invention, it is preferable that the display information displayed at the prescribed position of the display device includes at least one of a visual-field frame or a focus frame. This is because that the visual-field frame or the focus frame is the display information that should be displayed at the prescribed position of the display device.

It is preferable that an imaging device according to still another aspect of the invention comprises the finder device.

In the imaging device according to still another aspect of the invention, it is preferable that the display device is a self-luminous display device. This is because a self-luminous display device, such as a display device including a plurality of organic electro luminescence elements, has a problem of burn-in.

In the imaging device according to still another aspect of the invention, it is preferable that the optical finder is a finder optical system independent of the imaging optical system.

In the imaging device according to still another aspect of the invention, the optical finder is a single-lens reflex optical system that observes the optical image of the subject passing through the imaging optical system with an eyepiece unit.

Still another aspect of the invention provides a method of controlling an imaging device comprising an optical finder that observes an optical image of a subject, a display device (display), an optical element that is disposed in an optical path of the optical finder and superimposes the optical image of the subject observed through the optical finder and display information displayed on the display device, and an image sensor on which the optical image of the subject is formed through an imaging optical system (lens system). The method includes a step of moving the display information displayed at a prescribed position of the display device on the display device, a step of moving an imaging range of the image sensor corresponding to the display information moving on the display device, and a step of repeatedly executing each of the movement of the display information on the display device and the movement of the imaging range while changing an amount of movement.

According to still another aspect of the invention, the display information displayed at the prescribed position of the display device is moved on the display device, and the imaging range of the image sensor is moved corresponding to the display information moving on the display device. It is preferable that the movement of the display information and the movement of the imaging range are performed simultaneously. Then, each of the movement of the display information on the display device and the movement of the imaging range is repeatedly executed while changing the amount of movement, whereby burn-in of the display device is prevented.

Still another aspect of the invention provides a method of controlling a finder device comprising an optical finder that observes an optical image of a subject, a display device (display), and an optical element that is disposed in an optical path of the optical finder and superimposes the optical image of the subject observed through the optical finder and display information displayed on the display device. The method includes a step of moving the display device within the same plane as a display surface of the display device, a step of moving the display information on the display device and cancelling movement of the display information with the movement of the display device, and a step of repeatedly executing each of the movement of the display device and the movement of the display information on the display device while changing an amount of movement.

According to still another aspect of the invention, the display device itself is moved within the same plane as the display surface of the display device, and the display information is moved on the display device corresponding to the movement of the display device, whereby the movement of the display information with the movement of the display device is cancelled. It is preferable that the movement of the display device and the movement of the display information on the display device are performed simultaneously. Then, each of the movement of the display device and the movement of the display information on the display device is repeatedly executed while changing the amount of movement, whereby burn-in of the display device is prevented, and the display information is substantially prevented from moving.

Still another aspect of the invention provides a method of controlling a finder device comprising an optical finder that observes an optical image of a subject, a display device (display), an optical element that is disposed in an optical path of the optical finder and superimposes the optical image of the subject observed through the optical finder and display information displayed on the display device, and an optical system for display that is disposed between the display device and the optical element. The method includes a step of moving the display device or the optical system for display in an optical axis direction of the optical system for display and changing an optical magnification of the display information viewed through an eyepiece unit of the optical finder, a step of changing a display magnification of the display information displayed on the display device and cancelling change in the optical magnification of the display information, and a step of repeatedly executing each of the optical magnification of the display information and the display magnification of the display information while changing the magnification.

According to still another aspect of the invention, the display device or the optical system for display is moved in the optical axis direction of the optical system for display, the optical magnification of the display information viewed through the eyepiece unit of the optical finder is changed, and the display magnification of the display information displayed on the display device is changed with the change in the optical magnification of the display information, whereby the change in the optical magnification of the display information is cancelled. It is preferable that the change of the optical magnification of the display information and the change of the display magnification of the display information are performed simultaneously. Then, the optical magnification of the display information and the display magnification of the display information are changed, whereby it is possible to prevent burn-in of the display device, and even though the size of the display information displayed on the display device is magnified or reduced (even though a display position is changed), to prevent the size of the display information viewed through the eyepiece unit of the optical finder from being changed.

Still another aspect of the invention provides a control program for an imaging device comprising an optical finder that observes an optical image of a subject, a display device (display), an optical element that is disposed in an optical path of the optical finder and superimposes the optical image of the subject observed through the optical finder and display information displayed on the display device, and an image sensor on which the optical image of the subject is formed through an imaging optical system (lens system). The control program causes the imaging device to execute a function of moving the display information displayed at a prescribed position of the display device on the display device, a function of moving an imaging range of the image sensor corresponding to the display information moving on the display device, and a function of repeatedly executing each of the movement of the display information on the display device and the movement of the imaging range while changing an amount of movement.

Still another aspect of the invention provides a control program for a finder device comprising an optical finder that observes an optical image of a subject, a display device (display), and an optical element that is disposed in an optical path of the optical finder and superimposes the optical image of the subject observed through the optical finder and display information displayed on the display device. The control program causes the finder device execute a function of moving the display device within the same plane as a display surface of the display device, a function of moving the display information on the display device and cancelling movement of the display information with the movement of the display device, and a function of repeatedly executing each of the movement of the display device and the movement of the display information on the display device while changing an amount of movement.

Still another aspect of the invention provides a control program for a finder device comprising an optical finder that observes an optical image of a subject, a display device (display), an optical element that is disposed in an optical path of the optical finder and superimposes the optical image of the subject observed through the optical finder and display information displayed on the display device, and an optical system for display that is disposed between the display device and the optical element. The control program causes the finder device to execute a function of moving the display device or the optical system for display in an optical axis direction of the optical system for display and changing an optical magnification of the display information viewed through an eyepiece unit of the optical finder, a function of changing a display magnification of the display information displayed on the display device and cancelling change in the optical magnification of the display information, and a function of repeatedly executing each of the optical magnification of the display information and the display magnification of the display information while changing the magnification.

According to the invention, in displaying the display information displayed on the display device on the optical image of the subject observed through the optical finder in a superimposed manner, it is possible to prevent burn-in of the display device, and to prevent the relative positional relationship between the position of the display information displayed on the display device and the range, in which imaging is actually performed, from being changed.

DESCRIPTION OF THE PREFERRED EMBODIMENTS

Hereinafter, preferred embodiments of an imaging device, a finder device, a method of controlling an imaging device, a method of controlling a finder device, a control program for an imaging device, a control program for a finder device according to the invention will be described.

<Appearance of Imaging Device>

Figure 1:
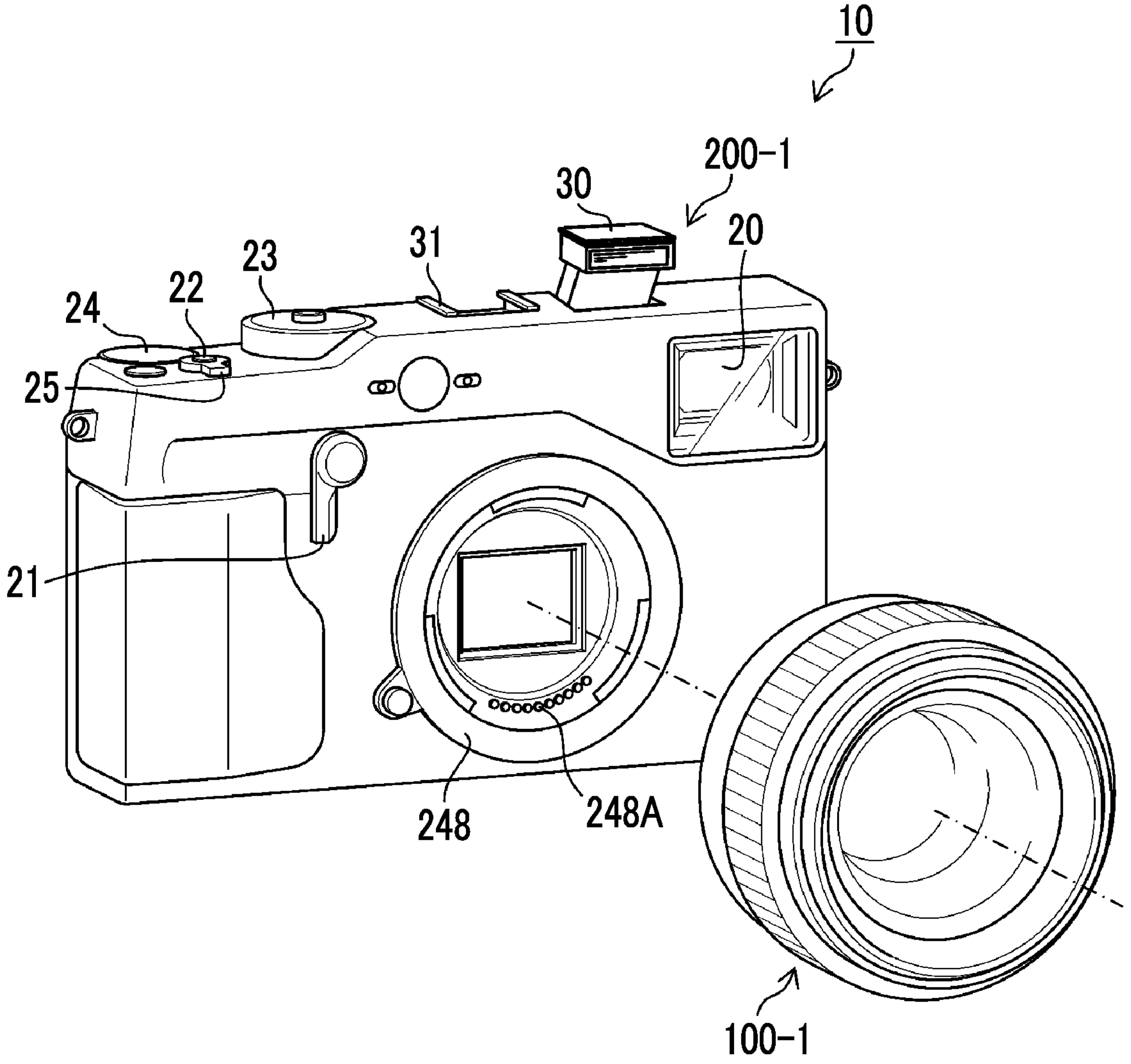
FIG. 1 is a perspective view of an imaging device of the invention when viewed obliquely from the front.
Figure 2:
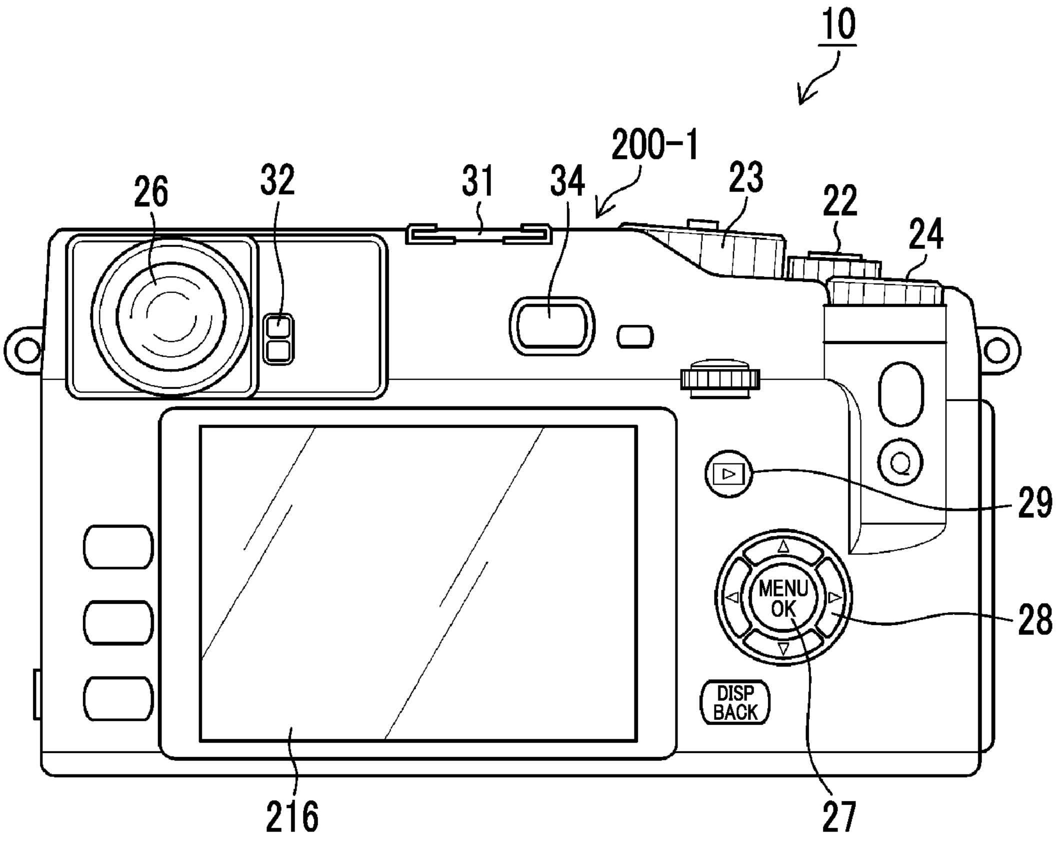
FIG. 2 is a rear view of the imaging device.

FIG. 1 is a perspective view of an imaging device when viewed obliquely from the front, and FIG. 2 is a rear view of the imaging device.

As shown in FIG. 1, an imaging device 10 is a mirror-less digital single-lens camera including an interchangeable lens 100-1 and a camera body 200-1 to which the interchangeable lens 100-1 is attachable and detachable.

In FIG. 1, a body mount 248 on which the interchangeable lens 100-1 is mounted, and an objective window 20 of an optical finder, a finder switching lever 21, and the like are provided on a front surface of the camera body 200-1, and a shutter release switch 22, a shutter speed dial 23, an exposure correction dial 24, a power lever 25, an internal flash 30, a hot shoe 31, and the like are primarily provided on an upper surface of the camera body 200-1.

As shown in FIG. 2, a liquid crystal monitor 216, an eyepiece unit (eyepiece window) 26 of the optical finder, a MENU/OK key 27, a cross key 28, a playback button 29, an eye sensor 32, a view mode button 34, and the like are primarily provided on a rear surface of the camera body 200-1.

The liquid crystal monitor 216 functions as a display unit that displays various menu screens in addition to displaying a live view image in an imaging mode or playing back and displaying a captured image in a playback mode. The MENU/OK key 27 is an operation key that has both of a function as a menu button for giving a command to display a menu on a screen of the liquid crystal monitor 216 and a function as an OK button for giving a command to confirm, execute, or the like a selected content. The cross key 28 is an operating unit that inputs instructions in four directions of up, down, right, and left, and functions as a button for selecting an item from a menu screen or instructing selection of various setting items from each menu. An up key and a down key of the cross key 28 function as a zoom switch at the time of imaging or a playback zoom switch in the playback mode, and a right key and a left key function as a frame advance (forward and backward advance) button in the playback mode.

As the MENU/OK key 27, the cross key 28, and the menu screen displayed on the liquid crystal monitor 216 are used, it is possible to perform setting of various imaging modes including a continuous shooting mode in which static images are continuously captured, in addition to a normal imaging mode in which one static image is captured. In a case where the continuous shooting mode is set, a continuous shooting speed (for example, about eight frames/second or about three frames/second) can be set.

The playback button 29 is a button that is used for switching to the playback mode in which a captured or recorded static image or video is displayed on the liquid crystal monitor 216.

The finder switching lever 21 shown in FIG. 1 is a switching lever that is used to switch the finder device 260-1 (FIG. 3) as a hybrid view finder functioning as an optical view finder (OVF) or an electronic view finder (EVF) to the OVF or the EVF. The finder device 260-1 is switched from the OVF to the EVF or is switched from the EVF to the OVE through an operation of the finder switching lever 21.

The view mode button 34 is a button that is used to switch between the hybrid view finder and the liquid crystal monitor 216. Each time the view mode button 34 is pressed, a mode in which the display of the hybrid view finder and the display of the liquid crystal monitor 216 are switched based on a detection output of the eye sensor 32, a mode in which the display of the hybrid view finder is fixed (the liquid crystal monitor 216 is set to non-display), and a mode in which the display of the liquid crystal monitor 216 is fixed (the hybrid view finder is set to non-display) are sequentially repeated.

The mode in which the display of the hybrid view finder and the display of the liquid crystal monitor 216 are switched based on the detection output of the eye sensor 32 is a mode in which switching to the display of the hybrid view finder is performed in a case where the eye sensor 32 detects that a face approaches the eyepiece window 26, and switching to the display of the liquid crystal monitor 216 is performed in a case where the eye sensor 32 detects the face is separated from the eyepiece window 26.

<Finder Device>

Figure 3:
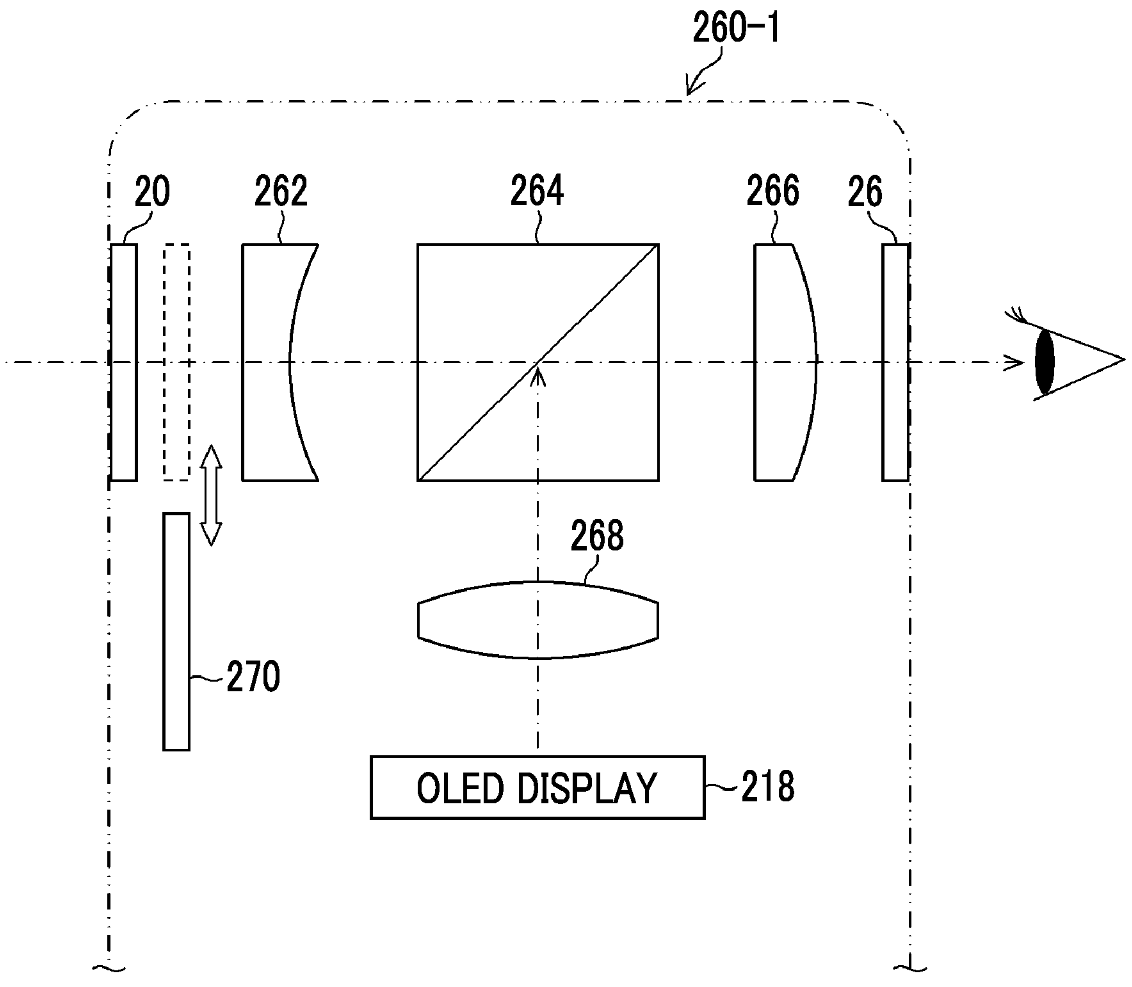
FIG. 3 is a schematic configuration diagram showing a finder device 260-1 of a first embodiment embedded in a camera body 200-1.

FIG. 3 is a schematic configuration diagram showing a finder device 260-1 of a first embodiment embedded in the camera body 200-1.

The finder device 260-1 shown in FIG. 3 is a hybrid view finder that functions the OVF or the EVF as described above, and primarily includes an objective lens 262, a beam splitter 264, an eyepiece lens 266, an organic light emitting diode (OLED) display 218, and a target lens 268 functioning as an optical system for display. The finder device 260-1 is independent of an imaging optical system 102 unlike a single-lens reflex type view finder.

A reverse Galileo type optical finder (OVF) is constituted of the concave objective lens 262 and the convex eyepiece lens 266, and the beam splitter 264 is disposed in an optical path between the objective lens 262 and the eyepiece lens 266.

The beam splitter 264 is constituted by bonding two right-angle prisms, and functions as an optical element that superimposes an optical image of a subject observed through the OVF and display information displayed on the OLED display 218 (display device). That is, the optical image incident on the objective lens 262 can be transmitted through the beam splitter 264 and observed through the eyepiece lens 266, and the display information displayed on the OLED display 218 can be reflected by the beam splitter 264 at right angles and observed through the eyepiece lens 266.

Figure 5:
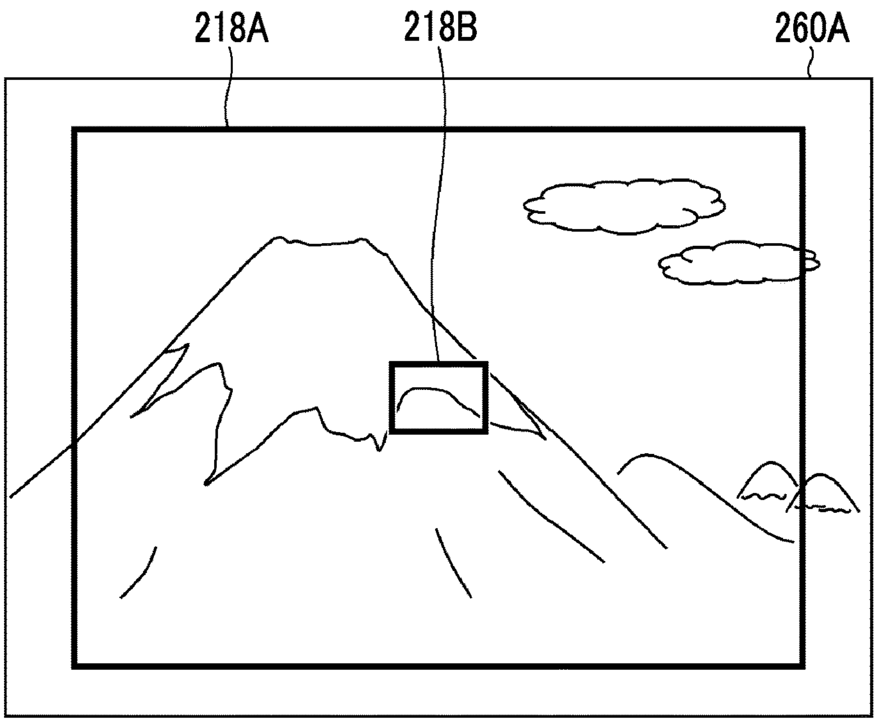
FIG. 5 is a diagram showing an example of an OVF screen.

The OLED display 218 is also referred to as an organic EL display, and is one of self-luminous display devices in which display elements arranged in a two-dimensional manner emit light by themselves. The OLED display 218 displays at least one of a visual-field frame 218A or a focus frame 218B as shown in FIG. 5, and icons indicating the number of capturable images, a battery remaining quantity, various setting modes, and the like are displayed in a region outside the visual-field frame 218A, in addition to imaging conditions of a shutter speed, an F number, International Organization for Standardization (ISO) sensitivity, and the like (not shown). The visual-field frame 218A is displayed as a bright frame that is bright enough to be visible even though the optical image is bright. Reference numeral 260A represents an OVF screen that is observed through the eyepiece lens 266.

The finder device 260-1 can be used as an electronic view finder (EVF) by inserting a shutter 270 in front of the objective lens 262 to block the incidence of the optical image of the subject and displaying a live view image on the OLED display 218.

<Internal Configuration of Imaging Device>

[Interchangeable Lens]

Figure 4:
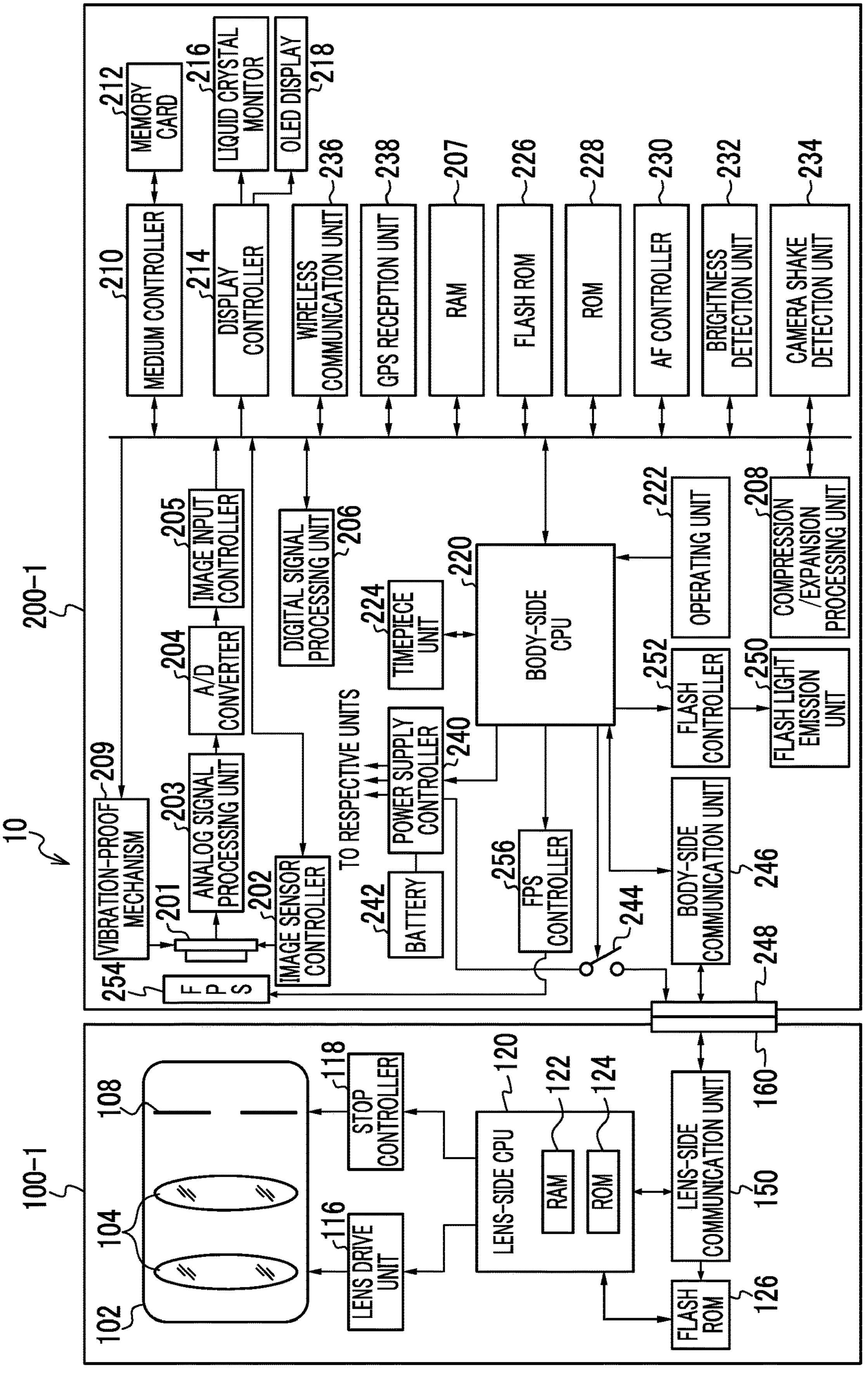
FIG. 4 is a block diagram showing an embodiment of the internal configuration of an imaging device 10.

FIG. 4 is a block diagram showing an embodiment of the internal configuration of the imaging device 10.

The interchangeable lens 100-1 shown in FIG. 4 is manufactured conforming to a communication standard of the camera body 200-1, and is a compatible interchangeable lens that can perform communication with the camera body 200-1.

The interchangeable lens 100-1 comprises an imaging optical system 102, a lens drive unit 116, a stop controller 118, a lens-side central processing unit (CPU) 120, a flash read only memory (ROM) 126, a lens-side communication unit 150, and a lens mount 160.

The imaging optical system 102 of the interchangeable lens 100-1 includes a lens group 104 including a focus lens and a stop 108.

The lens drive unit 116 moves the focus lens to a focus position (focusing position) in an optical axis direction according to a command from the lens-side CPU 120. The stop controller 118 controls the stop 108 according to a command from the lens-side CPU 120.

The lens-side CPU 120 integrally controls the interchangeable lens 100-1, and is embedded with a ROM 124 and a random access memory (RAM) 122.

The flash ROM 126 is a nonvolatile memory that stores programs or the like downloaded from the camera body 200-1.

The lens-side CPU 120 integrally controls the respective units of the interchangeable lens 100-1 according to a control program stored in the ROM 124 or the flash ROM 126 with the RAM 122 as a work area.

The lens-side communication unit 150 performs communication with the camera body 200-1 through a plurality of signal terminals (lens-side signal terminal) provided in the lens mount 160 in a state in which the lens mount 160 is mounted on the body mount 248 of the camera body 200-1. That is, the lens-side communication unit 150 performs transmission and reception (bidirectional communication) of a request signal and a response signal to and from a body-side communication unit 246 of the camera body 200-1 connected to the lens-side communication unit 150 through the lens mount 160 and the body mount 248 according to a command of the lens-side CPU 120, and notifies the camera body 200-1 of lens information (focus position information of the focus lens, focal length information, stop information, and the like) of each optical member of the imaging optical system 102.

The interchangeable lens 100-1 comprises a detection unit (not shown) that detects the focus position information of the focus lens and the stop information. Here, the stop information is information indicating an F number (F-Number) or the like of the stop 108.

It is preferable that the lens-side CPU 120 holds various kinds of lens information including the detected focus position information and stop information in the RAM 122 in order to meet a request for lens information from the camera body 200-1. The lens information is detected in a case where there is a request for lens information from the camera body 200-1, is detected when an optical member is driven, or is detected in a given cycle (a cycle sufficiently shorter than a frame cycle of video), and a detection result can be held.

The lens-side communication unit 150 performs communication with the camera body 200-1 through a plurality of signal terminals (lens-side signal terminal) provided in the lens mount 160 in a state in which the lens mount 160 is mounted on the body mount 248 of the camera body 200-1. That is, the lens-side communication unit 150 performs transmission and reception (bidirectional communication) of a request signal and a response signal to and from a body-side communication unit 246 of the camera body 200-1 connected to the lens-side communication unit 150 through the lens mount 160 and the body mount 248 according to a command of the lens-side CPU 120, and notifies the camera body 200-1 of lens information (focus position information of the focus lens, focal length information, stop information, and the like) of each optical member of the imaging optical system 102.

The interchangeable lens 100-1 comprises a detection unit (not shown) that detects the focus position information of the focus lens and the stop information. Here, the stop information is information indicating the F number (F-Number) of the stop 108, an aperture diameter of the stop 108, or the like. Hereinafter, in the example, an F-number is used as the stop information.

It is preferable that the lens-side CPU 120 holds various kinds of lens information including the detected focus position information and stop information in the RAM 122 in order to meet a request for lens information from the camera body 200-1. The lens information is detected in a case where there is a request for lens information from the camera body 200-1, is detected when an optical member is driven, or is detected in a given cycle (a cycle sufficiently shorter than a frame cycle of video), and a detection result can be held.

[Camera Body]

The camera body 200-1 constituting the imaging device 10 shown in FIG. 4 comprises an image sensor 201, an image sensor controller 202, an analog signal processing unit 203, an analog/digital (A/D) converter 204, an image input controller 205, a digital signal processing unit 206, a RAM 207, a compression/expansion processing unit 208, a vibration-proof mechanism 209, a medium controller 210, a memory card 212, a display controller 214, the liquid crystal monitor 216, the OLED display 218, a body-side CPU 220, an operating unit 222, a timepiece unit 224, a flash ROM 226, a ROM 228, an autofocus (AF) controller 230, a brightness detection unit 232, a camera shake detection unit 234, a wireless communication unit 236, a global positioning system (GPS) reception unit 238, a power supply controller 240, a battery 242, the body-side communication unit 246, the body mount 248, a flash light emission unit 250 constituting an internal flash 30 (FIG. 1), a flash controller 252, a focal-plane shutter (FPS) 254, and an FPS controller 256.

The image sensor 201 is constituted of a complementary metal-oxide semiconductor (CMOS) type color image sensor. The image sensor 201 is not limited to a CMOS type, and may be an XY address type or charge coupled device (CCD) type image sensor.

In the image sensor 201, color filters of red (R), green (G), and blue (B) are provided on a plurality of pixels constituted of photoelectric conversion elements (photodiodes) arranged in a two-dimensional manner in an x direction (horizontal direction) and a y direction (vertical direction) in a cyclic color array (for example, a general Bayer array), and a microlens is disposed on each photodiode.

The cyclic color array is not limited to a Bayer array, and may be other color filter arrays, such as an X-Trans (Registered Trademark) array. Alternatively, the image sensor 201 may be an image sensor in which phase difference pixels (a pair of first and second phase difference pixels) and a normal pixel for imaging (a pixel other than the phase difference pixels) are disposed. In a case of the image sensor 201 in which the phase difference pixels are disposed, it is possible to perform image plane phase difference AF.

The optical image of the subject formed on a light receiving surface of the image sensor 201 by the imaging optical system 102 of the interchangeable lens 100-1 is converted into an electric signal by the image sensor 201. Electric charge according to the amount of incident light is accumulated in each pixel of the image sensor 201, and an electric signal according to an amount of electric charge accumulated in each pixel is read as an image signal from the image sensor 201.

The image sensor controller 202 performs readout control of the image signal from the image sensor 201 according to a command of the body-side CPU 220. The image sensor controller 202 has an electronic shutter function of simultaneously discharging (simultaneously resetting) electric charge accumulated in each pixel of the image sensor 201 and starting exposure in response to an electronic shutter control signal from the body-side CPU 220.

The analog signal processing unit 203 executes various kinds of analog signal processing on an analog image signal obtained by imaging the subject with the image sensor 201. The analog signal processing unit 203 includes a sample-and-hold circuit, a color separation circuit, an automatic gain control (AGC) circuit, and the like. The AGC circuit functions as a sensitivity adjustment unit that adjusts sensitivity (International Organization for Standardization (ISO) sensitivity) at the time of imaging, and adjusts a gain of an amplifier that amplifies an input image signal, such that a signal level of the image signal falls within an appropriate range. The A/D converter 204 converts the analog image signal output from the analog signal processing unit 203 into a digital image signal.

Image data (mosaic image data) of each of RGB pixels output through the image sensor 201, the analog signal processing unit 203, and the A/D converter 204 at the time of imaging a static image or video is input from the image input controller 205 to the RAM 207 and is temporarily stored in the RAM 207. In a case where the image sensor 201 is a CMOS type image sensor, the analog signal processing unit 203 and the A/D converter 204 are often embedded in the image sensor 201.

The digital signal processing unit 206 executes various kinds of digital signal processing on image data stored in the RAM 207. The digital signal processing unit 206 suitably reads image data stored in the RAM 207, executes digital signal processing, such as offset processing, gain control processing including sensitivity correction, gamma correction processing, demosaic processing (also referred to as demosaicing processing), and RGB/YCrCb conversion processing, on read image data, and stores image data after digital signal processing in the RAM 207 again. The demosaic processing is processing for calculating color information of all RGB for each pixel from a mosaic image having RGB, for example, in a case of an image sensor including color filters of three colors of RGB, and generates demosaiced image data of three planes of RGB from mosaic data (dot-sequential RGB data).

The RGB/YCrCb conversion processing is processing for converting demosaiced RGB data into brightness data (Y) and color difference data (Cr and Cb).

The compression/expansion processing unit 208 executes compression/expansion processing on uncompressed brightness data Y and color difference data Cb and Cr stored in the RAM 207 once at the time of recording a static image or video. A static image is compressed, for example, in a Joint Photographic coding Experts Group (JPEG) format, and video is compressed, for example, in an H.264 format. Image data compressed by the compression/expansion processing unit 208 is recorded in the memory card 212 through the medium controller 210. The compression/expansion processing unit 208 executes expansion processing on compressed imaged data obtained from the memory card 212 through the medium controller 210 in the playback mode and generates uncompressed image data.

The medium controller 210 performs control for recording image data compressed by the compression/expansion processing unit 208 in the memory card 212. The medium controller 210 performs control for reading compressed image data from the memory card 212.

The display controller 214 controls the liquid crystal monitor 216 including a liquid crystal display device and the OLED display 218.

In a case where a live view image is displayed on the liquid crystal monitor 216, digital image signals continuously generated by the digital signal processing unit 206 are temporarily stored in the RAM 207. The display controller 214 converts the digital image signals temporarily stored in the RAM 207 into image signals in a signal format for display and sequentially the image signals to the liquid crystal monitor 216. With this, a captured image is displayed on the liquid crystal monitor 216 in real time, and composition can be decided through a live view image displayed on the liquid crystal monitor 216.

In a case where the finder device 260-1 is used as an OVF, the display controller 214 makes the OLED display 218 display information including the visual-field frame 218A, the focus frame 218B, and other kinds of information as shown in FIG. 5. With this, the display information (visual-field frame 218A, focus frame 218B, and the like) displayed on the OLED display 218 can be displayed on the optical image of the subject observed through the OVF in a superimposed manner as described referring to FIG. 3.

In a case where the finder device 260-1 is used as an EVF, the shutter 270 is inserted in front of the objective lens 262 to block the incidence of the optical image of the subject, and the display controller 214 makes the OLED display 218 display a live view image in the same manner as the liquid crystal monitor 216.

The display controller 214 performs display control for moving display information displayed at a prescribed position of the OLED display 218 on a display surface of the OLED display 218 in order to prevent burn-in (the same OLED element continuously emits light for a long time and a display function is damaged) of the OLED display 218 as one of self-luminous display devices. Details of the display control for preventing burn-in of the OLED display 218 will be described below.

The shutter release switch 22 is an imaging instruction unit that inputs an instruction of imaging, and is constituted of a so-called two-stage stroke type switch including “half push” and “full push”.

In a case of a static image imaging mode, when the shutter release switch 22 is subjected to half push, an S1-on signal is output, and when the shutter release switch 22 is further pushed from half push and is subjected to full push, an S2-on signal is output. In a case where the S1-on signal is output, the body-side CPU 220 executes imaging preparation processing, such as autofocus (AF) control and auto exposure control (AE control), and in a case where the S2-on signal is output, executes imaging processing and recording processing of a static image. It is needless to say that the AF control and the AE control are automatically performed in a case where an auto mode is set by the operating unit 222, and the AF control and the AE control are not performed in a case where a manual mode is set.

In a case where a video imaging mode, in a case where the shutter release switch 22 is subjected to full push and the S2-on signal is output, the camera body 200-1 is brought into a video recording mode in which video recording is started, and executes image processing and recording processing of video. Thereafter, in a case where the shutter release switch 22 is subjected to full push again and the S2-on signal is output, the camera body 200-1 is brought into a standby state and stops the recording processing of video.

The shutter release switch 22 is not limited to a form of a two-stage stroke type switch including half push and full push, the S1-on signal and the S2-on signal may be output by a single operation or individual switches may be provided to output the S1-on signal and the S2-on signal, respectively.

In a form in which an operation instruction is performed by a touch type panel or the like, an operation instruction may be output as a region corresponding to the operation instruction displayed on a screen of the touch type panel as operating means is touched. The form of the operating means is not limited thereto as long as the operating means instructs the imaging preparation processing or the imaging processing.

A static image or video acquired by imaging is compressed by the compression/expansion processing unit 208, and compressed image data is stored in the memory card 212 through the medium controller 210 after converted into an image file in which needed additional information, such as imaging date and time, GPS information, and imaging conditions (F-Number, shutter speed, ISO sensitivity, and the like) is added to a header.

The body-side CPU 220 integrally controls the overall operation of the camera body 200-1, the drive of the optical members of the interchangeable lens 100-1, and the like, and controls the respective units of the camera body 200-1 and the interchangeable lens 100-1 based on an input from the operating unit 222 including the shutter release switch 22, or the like.

The timepiece unit 224 measures a time based on a command from the body-side CPU 220 as a timer. The timepiece unit 224 measures current date and time as a calendar.

The flash ROM 226 is a readable and writable nonvolatile memory and stores setting information.

In the ROM 228, a camera control program (including a control program for an imaging device and a control program for a finder device) that is executed by the body-side CPU 220, defect information of the image sensor 201, and various parameters or tables for use in image processing and the like are stored. The body-side CPU 220 controls the respective units of the camera body 200-1 and the interchangeable lens 100-1 according to the camera control program stored in the ROM 228 using the RAM 207 as a work area. A medium in which the camera control program (including the control program for an imaging device and the control program for a finder device) is stored may be a non-transitory computer-readable recording medium, such as a hard disk, a compact disk (CD), a digital versatile disk (DVD), or various semiconductor memories.

In a case where the image sensor 201 is an image sensor in which phase difference pixels are disposed, the AF controller 230 calculates an amount of defocus by multiplying an amount of phase shift of each output of a pair of phase difference pixels on the phase image sensor 201 and a coefficient corresponding to a current F-Number (ray angle) of the interchangeable lens 100-1 and outputs the calculated amount of defocus to the body-side CPU 220.

The body-side CPU 220 transmits the amount of defocus input from the AF controller 230 to the lens-side CPU 120 through communication. The lens drive unit 116 of the interchangeable lens 100-1 moves the focus lens to the focus position (focusing position) in the optical axis direction according to a command (the amount of defocus) from the lens-side CPU 120. With this, focus adjustment is automatically performed.

In a case where the image sensor 201 is not an image sensor in which phase difference pixels are disposed, the AF controller 230 extracts a high-frequency component from a G signal of a G pixel (a pixel having a color filter of G) in an AF region corresponding to the focus frame 218B, calculates an integrated value (focus evaluation value) of an absolute value of the extracted high-frequency component, and outputs a position where the calculated focus evaluation value becomes maximum (that is, a position where contrast becomes maximum) as focus position information to the body-side CPU 220.

The body-side CPU 220 transmits the amount of defocus input from the AF controller 230 to the lens-side CPU 120 through communication. The lens drive unit 116 of the interchangeable lens 100-1 moves the focus lens to the focus position (focusing position) in the optical axis direction according to a command (focus position information) from the lens-side CPU 120. With this, focus adjustment is automatically performed.

The brightness detection unit 232 is a unit that detects brightness (subject brightness) of the subject, and calculates a numerical value (exposure value (EV value)) needed for AE control and auto white balance (AWB) control corresponding to subject brightness. The brightness detection unit 232 calculates the EV value based on brightness of an image acquired through the image sensor 201 and a shutter speed and an F-number at the time of acquisition of brightness of the image.

The body-side CPU 220 decides an F-number, a shutter speed, and ISO sensitivity from a predetermined program diagram based on the EV value obtained from the brightness detection unit 232, and can perform the AE control.

A vibration-proof device is constituted of the vibration-proof mechanism 209, the camera shake detection unit 234, and the body-side CPU 220 (or a dedicated shake controller) functioning as a shake controller.

The camera shake detection unit 234 includes, for example, a gyro sensor, detects angular velocities of the camera body 200-1 in a right-left direction (yaw direction) and an up-down direction (pitch direction) using the gyro sensor, and integrates the detected angular velocities to output angle signals (yaw angle signal and pitch angle signal) indicating shake angles of the camera body 200-1 in the yaw direction and the pitch direction to the shake controller in real time.

The vibration-proof mechanism 209 moves the image sensor 201 in a right-left direction (x direction) and an up-down direction (y direction) within a plane perpendicular to the optical axis direction using a voice coil motor or the like.

The shake controller moves the image sensor 201 in the x direction and the y direction through the vibration-proof mechanism 209 based on the yaw angle signal and the pitch angle signal) in order to correct (cancel) image shake accompanied with camera shake of the camera body 200-1 in the yaw direction and the pitch direction.

The vibration-proof device including the vibration-proof mechanism 209 and the like also functions as an imaging range movement controller that moves the image sensor 201 in conjunction with the movement of the display information for preventing burn-in of the OLED display 218. Control of the vibration-proof device that functions as an imaging range movement controller will be described below.

The wireless communication unit 236 is a unit that performs short-distance wireless communication of a standard, such as Wireless Fidelity (Wi-Fi) (Registered Trademark) or Bluetooth (Registered Trademark), and performs transmission and reception of needed information to and from peripheral digital equipment (a portable terminal, such as a smartphone).

The GPS reception unit 238 receives GPS signals from a plurality of GPS satellites according to an instruction of the body-side CPU 220, executes positioning calculation processing based on a plurality of received GPS signals, and acquires GPS information including a latitude, a longitude, and an altitude of the camera body 200-1. The acquired GPS information can be recorded in the header of the image file as additional information indicating an imaging position of the captured image.

The power supply controller 240 supplies a power supply voltage supplied from the battery 242 to the respective units of the camera body 200-1 according to a command of the body-side CPU 220. The power supply controller 240 supplies the power supply voltage supplied from the battery 242 to the respective units of the interchangeable lens 100-1 through the body mount 248 and the lens mount 160 according to a command of the body-side CPU 220.

A lens power switch 244 performs switching of on and off and switching of the level of the power supply voltage supplied to the interchangeable lens 100-1 through the body mount 248 and the lens mount 160 according to a command of the body-side CPU 220.

The body-side communication unit 246 performs transmission and reception (bidirectional communication) of a request signal and a response signal to and from the lens-side communication unit 150 of the interchangeable lens 100-1 connected to the body-side communication unit 246 through the body mount 248 and the lens mount 160 according to a command of the body-side CPU 220. The body mount 248 is provided with a plurality of terminals 248A as shown in FIG. 1. In a case where the interchangeable lens 100-1 is mounted in the camera body 200-1 (the lens mount 160 and the body mount 248 are connected), a plurality of terminals 248A (FIG. 1) provided in the body mount 248 and a plurality of terminals (not shown) provided in the lens mount 160 are electrically connected, and bidirectional communication can be performed between the body-side communication unit 246 and the lens-side communication unit 150.

The internal flash 30 (FIG. 1) is, for example, a through the lens (TTL) automatic dimming type flash, and is constituted of the flash light emission unit 250 and the flash controller 252.

The flash controller 252 has a function of adjusting an amount (guide number) of flash light that is emitted from the flash light emission unit 250. That is, the flash controller 252 makes the flash light emission unit 250 emit light in synchronization with a flash imaging instruction from the body-side CPU 220, starts photometry of reflected light (including ambient light) incident through the imaging optical system 102 of the interchangeable lens 100-1, and stops emission of flash light from the flash light emission unit 250 in a case where a photometric value reaches a standard exposure value.

The focal-plane shutter (FPS) 254 constitutes a mechanical shutter of the imaging device 10 and is disposed immediately before the image sensor 201. The FPS controller 256 controls opening and closing of front curtains and rear curtains of the FPS 254 based on input information (S2-on signal, shutter speed, and the like) from the body-side CPU 220 and controls an exposure time (shutter speed) in the image sensor 201.

First Embodiment

Next, a first embodiment of an imaging device that prevents burn-in of the OLED display 218 will be described.

In a case where the finder device 260-1 (FIG. 3) that is a hybrid view finder is used as an OVF, the visual-field frame 218A and the focus frame 218B (FIG. 5) are displayed on the OLED display 218. In FIG. 5, although the visual-field frame 218A and the focus frame 218B are indicated by thick black lines, the visual-field frame 218A and the focus frame 218B are actually displayed as bright white lines, OLED elements corresponding to the white lines are high in emission brightness, and in a case where light emission is continued for a long time, burn-in occurs.

The visual-field frame 218A is an index that indicates an imaging range of the image sensor 201, and the focus frame 218B is an index that specifies a target for AF. The focus frame 218B can be moved to an arbitrary position through user setting according to a position of the subject to be focused; however, the visual-field frame 218A is not moved generally and is displayed at a prescribed position on the display surface of the OLED display 218. This is because, in a case where the visual-field frame 218A is moved, an imaging range to be confirmed by the user through the visual-field frame 218A and a range, in which imaging is actually performed, are shifted, and an image different from the composition intended by the user is captured.

In the first embodiment of the imaging device that prevents burn-in of the OLED display 218, the display controller 214 moves the visual-field frame 218A and the focus frame 218B, which are displayed on the OLED display 218, on the OLED display 218.

Figure 6:
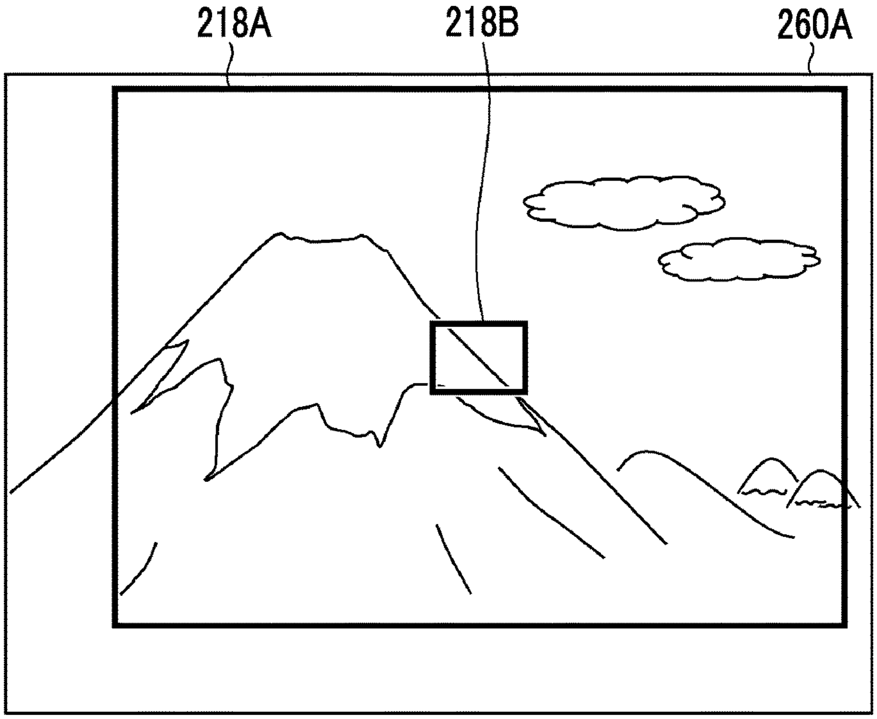
FIG. 6 is a diagram showing the OVF screen in which a visual-field frame 218A, a focus frame 218B, and the like are moved.

FIG. 6 shows a case where the visual-field frame 218A and the focus frame 218B shown in FIG. 5 are moved in an upper right direction on FIG. 6. Although each of the visual-field frame 218A and the focus frame 218B shown in FIG. 6 is significantly moved such that an amount of movement with respect to each of the visual-field frame 218A and the focus frame 218B shown in FIG. 5 is understood, for example, the visual-field frame 218A and the focus frame 218B may be moved within a range of about a line width of a frame line. A direction of movement of each of the visual-field frame 218A and the focus frame 218B is not limited to the upper right direction, and it is preferable that each of the visual-field frame 218A and the focus frame 218B may be moved, for example, in a direction suitably selected from a plurality of directions, such as four directions of up, down, right, and left directions or eight directions of up, down, right, and left directions and diagonal directions.

On the other hand, in a case where the visual-field frame 218A or the like is moved on the OLED display 218, an image in an imaging range different from the composition intended by the user is captured. For this reason, the vibration-proof device that functions as an imaging range movement controller and includes the vibration-proof mechanism 209 and the like moves the image sensor 201 in a direction perpendicular to the optical axis direction of the imaging optical system 102 corresponding to the amount of movement of the visual-field frame 218A or the like on the OLED display 218 and moves the imaging range of the image sensor 201.

In a case where a position where the center of the image sensor 201 coincides with the optical axis of the imaging optical system 102 is set as a position (reference position) of the image sensor 201 in a case where camera shake is not detected, the reference position of the image sensor 201 is moved corresponding to the amount of movement of the visual-field frame 218A or the like on the OLED display

218, whereby it is possible to move the imaging range of the image sensor 201 and to maintain the function as the vibration-proof device.

In the example, since the image sensor 201 is moved using the function of moving the image sensor 201 provided in the vibration-proof device including the vibration-proof mechanism 209 and the like, it is possible to move the image sensor 201 without adding new hardware. In a case of a camera body that does not comprise the vibration-proof device including the vibration-proof mechanism 209 and the like, there is a need to provide a sensor movement controller that the image sensor 201 is moved in the direction perpendicular to the optical axis direction of the imaging optical system 102 and moves the imaging range of the image sensor 201.

It is preferable that the movement of the visual-field frame 218A or the like on the OLED display 218 and the movement of the image sensor 201 corresponding to the movement of the visual-field frame 218A or the like are performed, for example, in a case where a given condition that the user is not looking through the OVF is satisfied. This is because, when the user is looking through the OVF, in a case where the visual-field frame 218A or the like is moved, the user may feel a sense of discomfort.

As a case where the given condition that the user is not looking through the OVF is satisfied, a case where the power supply of the OLED display 218 is switched from OFF to ON or a case where switching among various modes is performed is considered. For example, as a case where the power supply of the OLED display 218 is switched from OFF to ON, a case where power is supplied by the power lever 25 or a case where the display of the hybrid view finder (OLED display 218) is switched from OFF to ON based on a detection output of the eye sensor 32 is considered. As a case where switching among various modes is performed, a case where the shutter release switch 22 is subjected to half push and the mode is switched to the imaging mode is performed during the playback mode by the operation of the playback button 29 or a case where the mode is switched among a mode in which the display of the hybrid view finder and the display of the liquid crystal monitor 216 are switched based on the detection output of the eye sensor 32 by the operation of the view mode button 34, a mode in which the display of the hybrid view finder is fixed, and a mode in which the display of the liquid crystal monitor 216 is fixed is considered.

Furthermore, since the camera shake detection unit 234 is provided, the given condition that the user is not looking through the OVF can be satisfied even though an angle signal that exceeds an angle signal generated in a case where the user is looking through the OVF is output from the camera shake detection unit 234.

In addition, it is preferable that each time the given condition that the user is not looking through the OVF is satisfied, the movement of the visual-field frame 218A or the like on the OLED display 218 and the movement of the image sensor 201 corresponding to the movement of the visual-field frame 218A or the like are performed while sequentially changing the amount of movement or the direction of movement. For example, it is considered that the direction of movement is changed in an order of, for example, the right direction→the up direction→the left direction→the down direction→the right direction.

According to the first embodiment, since the image sensor 201 is moved corresponding to the movement of the visual-field frame 218A or the like on the OLED display 218, and the imaging range of the image sensor 201 is moved simultaneously, it is possible to make an imaging range to be confirmed by the user through the visual-field frame 218A after movement coincide with an imaging range, in which imaging is actually performed. Furthermore, since the display information of the visual-field frame 218A or the like displayed on the OLED display 218 is moved, it is possible to prevent burn-in of the OLED display 218 due to the display of the visual-field frame 218A or the like.

Second Embodiment

Figure 7:
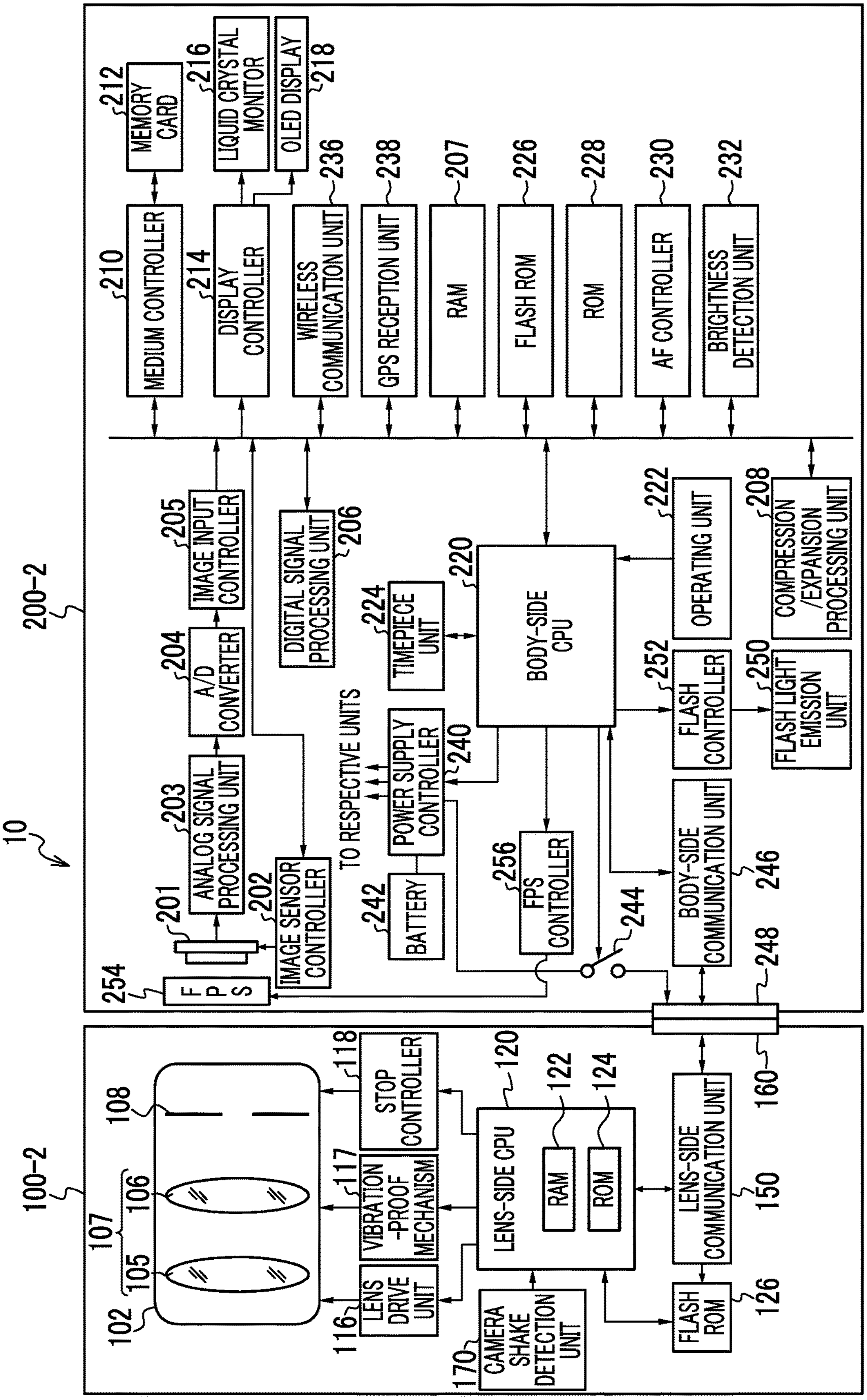
FIG. 7 is a block diagram showing the internal configuration of an imaging device of a second embodiment that prevents burn-in of an OLED display 218.

FIG. 7 is a block diagram showing the internal configuration of an imaging device of a second embodiment that prevents burn-in of the OLED display 218. The portions common to the internal configuration of the imaging device shown in FIG. 4 are represented by the same reference numerals, and detailed description thereof will not be repeated.

The second embodiment shown in FIG. 7 is different from the first embodiment in that the vibration-proof mechanism 209 and the camera shake detection unit 234 are not provided in the camera body 200-2, and a vibration-proof mechanism 117 and a camera shake detection unit 170 are provided in an interchangeable lens 100-2.

A vibration-proof device of the second embodiment is constituted of the vibration-proof mechanism 117, the camera shake detection unit 170, and the lens-side CPU 120 (or a dedicated shake controller) functioning as a shake controller.

The camera shake detection unit 170 includes a gyro sensor like the camera shake detection unit 234, detects angular velocities of the interchangeable lens 100-2 in the right-left direction (yaw direction) and the up-down direction (pitch direction) using the gyro sensor, and integrates the detected angular velocities to output angle signals (yaw angle signal and pitch angle signal) indicating shake angles of the interchangeable lens 100-2 in the yaw direction and the pitch direction to the shake controller in real time.

The vibration-proof mechanism 117 moves a shake correction lens 106 in a lens group 107 including a focus lens 105 and the shake correction lens 106 in the right-left direction (x direction) and the up-down direction (y direction) within the plane perpendicular to the optical axis direction of the imaging optical system 102 using a voice coil motor or the like.

The shake controller moves the shake correction lens 106 in the x direction and the y direction through the vibration-proof mechanism 117 in order to correct (cancel) image shake accompanied with camera shake of the interchangeable lens 100-2 in the yaw direction and the pitch direction based on the yaw angle signal and the pitch angle signal.

The vibration-proof device including the shake correction lens 106 and the vibration-proof mechanism 117 also functions as an imaging range movement controller that moves the shake correction lens 106 in conjunction with the movement of the display information for preventing burn-in of the OLED display 218.

In the first embodiment of the imaging device that prevents burn-in of the OLED display 218, the display controller 214 moves the visual-field frame 218A and the focus frame 218B, which are displayed on the OLED display 218, on the OLED display 218 (FIGS. 5 and 6).

On the other hand, in a case where the visual-field frame 218A or the like is moved on the OLED display 218, an image in an imaging range different from the composition intended by the user is captured. For this reason, the vibration-proof device that functions as an imaging range movement controller and includes the shake correction lens 106, the vibration-proof mechanism 117, and the like moves the shake correction lens 106 in the direction perpendicular to the optical axis direction of the imaging optical system 102 corresponding to the amount of movement of the visual-field frame 218A or the like on the OLED display 218, and as a result, moves the imaging range of the image sensor 201.

In a case where a position where the center of the shake correction lens 106 coincides with the optical axis of the imaging optical system 102 is set as a position (reference position) of the shake correction lens 106 in a case where camera shake is not detected, the reference position of the shake correction lens 106 is moved corresponding to the amount of movement of the visual-field frame 218A or the like on the OLED display 218, whereby it is possible to move the imaging range of the image sensor 201, and to maintain the function as the vibration-proof device.

In the example, since the shake correction lens 106 is moved using the function of the vibration-proof device of moving the shake correction lens 106 (at least a part of optical members of the imaging optical system) provided in the vibration-proof device, it is possible to move the imaging range of the image sensor 201 without adding new hardware. In a case of an interchangeable lens that does not comprise the vibration-proof device including the shake correction lens 106 and the like, there is a need to provide an optical member movement controller that moves at least a part of optical members of the imaging optical system in the direction perpendicular to the optical axis direction of the imaging optical system 102 and moves the imaging range of the image sensor 201.

According to the second embodiment, since the shake correction lens 106 is moved corresponding to the movement of the visual-field frame 218A or the like on the OLED display 218, and the imaging range of the image sensor 201 is moved simultaneously, it is possible to make an imaging range to be confirmed by the user through the visual-field frame 218A after movement coincide with an imaging range, in which imaging is actually performed. Furthermore, since the display information of the visual-field frame 218A or the like displayed on the OLED display 218 is moved, it is possible to prevent burn-in of the OLED display 218 due to the display of the visual-field frame 218A or the like.

Third Embodiment

Figure 8:
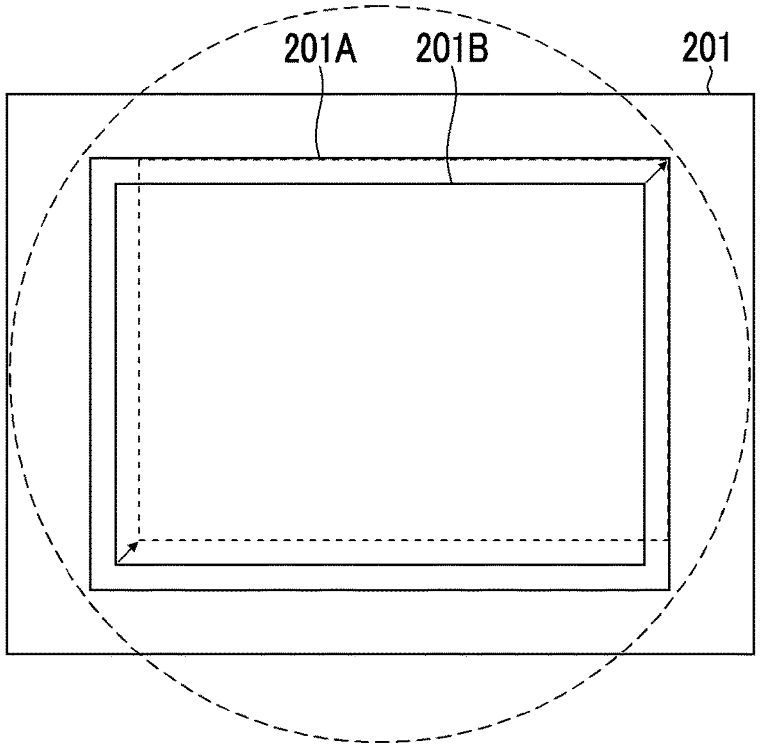
FIG. 8 is a front view of an image sensor 201 used in describing a third embodiment that prevents burn-in of the OLED display 218.

FIG. 8 is a front view of an image sensor 201 used in describing a third embodiment that prevents burn-in of the OLED display 218.

In FIG. 8, a circle indicated by a broken line is an image circle where a subject image is formed on the image sensor 201 by the imaging optical system 102, and there is an effective pixel region 201A of the image sensor 201 in the image circle. Pixels in the effective pixel region 201A are pixels that can be used in imaging.

Inside the effective pixel region 201A, there is an imaging pixel region 201B of a captured image to be actually recorded. The number of recorded pixels of a captured image using all pixels of the imaging pixel region 201B becomes a maximum image size (for example, 4896×3264). In general, the effective pixel region 201A is greater than the imaging pixel region 201B, and there is a marginal portion that is not used in imaging.

In the third embodiment, an image cutout unit (the image sensor controller 202 that is controlled by the body-side CPU 220) controls a cutout position of the imaging pixel region 201B to be cut out from the effective pixel region 201A of the image sensor 201 and moves the imaging range of the image sensor 201.

In FIG. 8, a frame indicated by a dotted line indicates an imaging pixel region where a cutout range of the imaging pixel region 201B is moved in an upper right direction.

In the third embodiment of the imaging device that prevents burn-in of the OLED display 218, the display controller 214 moves the visual-field frame 218A and the focus frame 218B, which are displayed on the OLED display 218, on the OLED display 218 (FIGS. 5 and 6).

On the other hand, in a case where the visual-field frame 218A or the like is moved on the OLED display 218, an image in an imaging range different from the composition intended by the user is captured. For this reason, the image cutout unit that functions as an imaging range movement controller controls the cutout position of the imaging pixel region 201B to be cut out from the effective pixel region 201A of the image sensor 201 corresponding to the amount of movement of the visual-field frame 218A or the like on the OLED display 218 and moves the imaging range of the image sensor 201.

According to the third embodiment, since the cutout position of the imaging pixel region 201B to be cut out from the effective pixel region 201A of the image sensor 201 is controlled corresponding to the movement of the visual-field frame 218A or the like on the OLED display 218, and the imaging range of the image sensor 201 is moved simultaneously, it is possible to make an imaging range to be confirmed by the user through the visual-field frame 218A after movement coincide with an imaging range of an image to be actually recorded. Furthermore, since the display information of the visual-field frame 218A or the like displayed on the OLED display 218 is moved, it is possible to prevent burn-in of the OLED display 218 due to the display of the visual-field frame 218A or the like.

Furthermore, since the imaging range of the image sensor 201 is moved according to the cutout position of the image cutout unit, it is possible to move the imaging range of the image sensor 201 without adding hardware.

Fourth Embodiment

Figure 9:
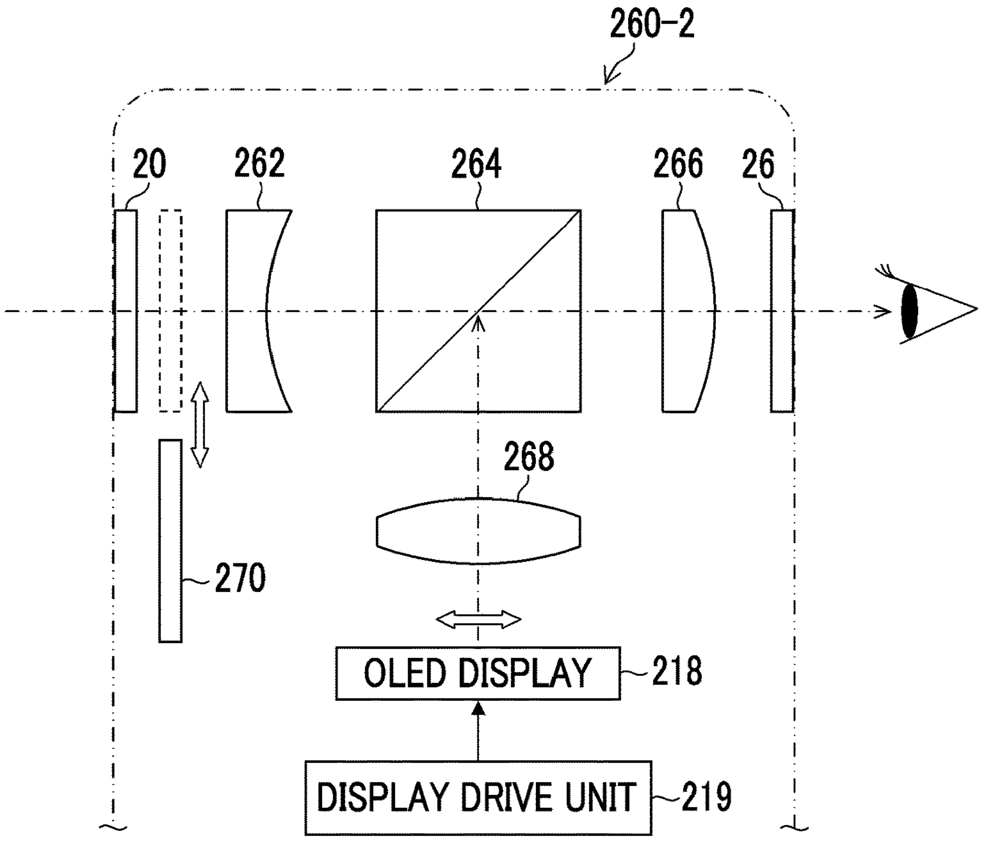
FIG. 9 is a schematic configuration diagram showing a finder device 260-2 of a second embodiment embedded in a camera body 200-1.

FIG. 9 is a schematic configuration diagram showing a finder device 260-2 of a second embodiment embedded in the camera body 200-1, and in particular, the finder device 260-2 corresponds to a fourth embodiment that prevents burn-in of the OLED display 218. The portions common to the finder device 260-1 of the first embodiment shown in FIG. 3 are represented by the same reference numerals, and detailed description thereof will not be repeated.

The finder device 260-2 of the second embodiment shown in FIG. 9 is different from the finder device 260-1 of the first embodiment in that a display drive unit 219 is primarily provided.

The display drive unit 219 functions as a display device movement controller that moves the OLED display 218 within the same plane as the display surface of the OLED display 218. The OLED display 218 is moved within the same plane as the display surface of the OLED display 218 by the display drive unit 219, whereby it is possible to move the display information, such as the visual-field frame 218A, which is viewed through the OVF and displayed on the OLED display 218, with respect to the optical image of the subject.

In the fourth embodiment of the imaging device (finder device) that prevents burn-in of the OLED display 218, the OLED display 218 is moved within the same plane as the display surface of the OLED display 218 by the display drive unit 219.

On the other hand, in a case where the visual-field frame 218A or the like that is observed through the OVF is moved with the movement of the OLED display 218, an image in an imaging range different from the composition intended by the user is captured. For this reason, the display controller 214 moves the display information, such as the visual-field frame 218A, which is displayed on the OLED display 218, on the OLED display 218 corresponding to the movement of the OLED display 218 and cancels the movement of the display information with the movement of the OLED display 218.

Figure 10:
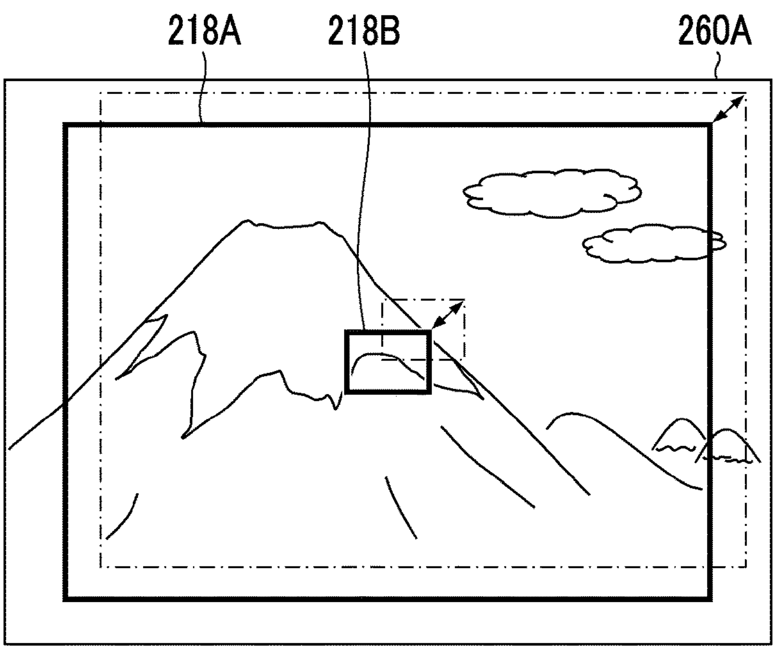
FIG. 10 is a diagram showing another example of an OVF screen.

The movement of the OLED display 218 causes, for example, the movement of the display information, such as the visual-field frame 218A, within an OVF screen 260A as indicated by a one-dot-chain line as shown in FIG. 10. In order to cancel the movement of the display information, the visual-field frame 218A or the like that is displayed on the OLED display 218 is moved by the display controller 214. As a result, the display information, such as the visual-field frame 218A, is not moved on the OVF screen 260A and is held at a position indicated by a solid line.

According to the fourth embodiment, even though the display information, such as the visual-field frame 218A, displayed on the OLED display 218 is moved, it is possible to prevent the movement of (to fix) the display information on the OVF screen 260A, and to make an imaging range to be confirmed by the user through the visual-field frame 218A coincide with an imaging range of an image to be actually recorded. Furthermore, since the display information of the visual-field frame 218A or the like displayed on the OLED display 218 is moved, it is possible to prevent burn-in of the OLED display 218 due to the display of the visual-field frame 218A or the like.

It is preferable that the movement of the OLED display 218 within the plane and the movement of the display information, such as the visual-field frame 218A, displayed on the OLED display 218 are performed simultaneously. In this case, even when the movement is performed at any timing, since the display information, such as the visual-field frame 218A, does not move on the OVF screen 260A, the user does not feel a sense of discomfort.

Fifth Embodiment

Figure 11:
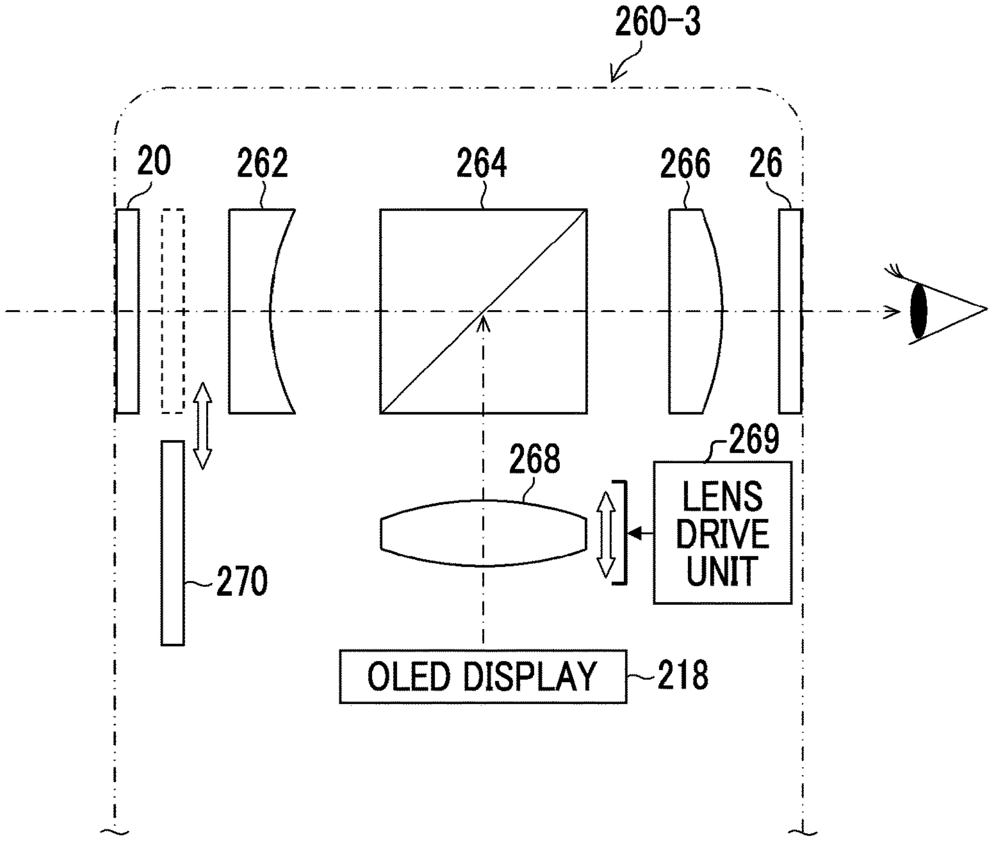
FIG. 11 is a schematic configuration diagram showing a finder device 260-3 of a third embodiment embedded in a camera body 200-1.

FIG. 11 is a schematic configuration diagram of a finder device 260-3 of a third embodiment embedded in the camera body 200-1, and in particular, the finder device 260-3 corresponds to a fifth embodiment that prevents burn-in of the OLED display 218. The portions common to the finder device 260-1 of the first embodiment shown in FIG. 3 are represented by the same reference numerals, and detailed description thereof will not be repeated.

The finder device 260-3 of the third embodiment shown in FIG. 11 is different from the finder device 260-1 of the first embodiment in that a lens drive unit 269 is primarily provided.

The lens drive unit 269 functions as an optical magnification controller that moves the target lens 268 in an optical axis direction of the target lens 268. That is, the target lens 268 is moved in the optical axis direction of the target lens 268 by the lens drive unit 269, whereby it is possible to change an optical magnification of the display information, such as the visual-field frame 218A, which is viewed through the OVF and displayed on the OLED display 218, and to magnify or reduce the display information, such as the visual-field frame 218A.

In the fifth embodiment of the imaging device (finder device) that prevents burn-in of the OLED display 218, the optical magnification of the display information, such as the visual-field frame 218A, displayed on the OLED display 218 is changed with the movement of the target lens 268 by the lens drive unit 269.

On the other hand, the optical magnification is changed with the movement of the target lens 268, and the visual-field frame 218A or the like observed through the OVF is magnified or reduced, an image in an imaging range different from the composition intended by the user is captured. For this reason, the display controller 214 that functions as a display magnification controller changes a display magnification of the display information, such as the visual-field frame 218A, displayed on the OLED display 218 and cancels the change of the optical magnification of the display information.

Figure 12:
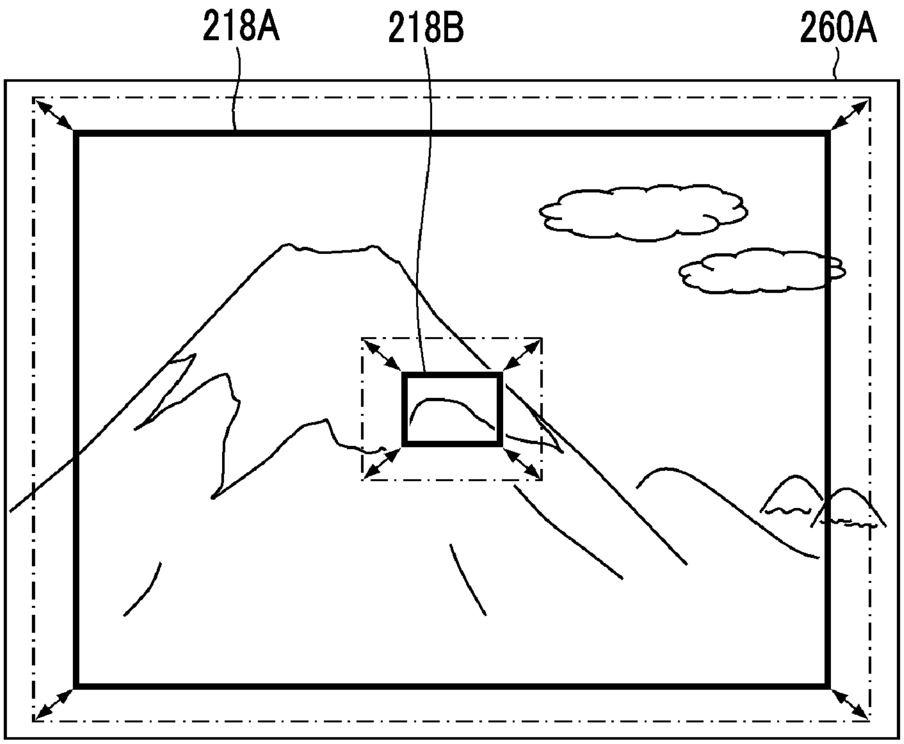
FIG. 12 is a diagram showing still another example of an OVF screen.

The movement of the target lens 268 causes, for example, the movement of the display information, such as the visual-field frame 218A, within the OVF screen 260A as indicated by a one-dot-chain line as shown in FIG. 12. In order to cancel the magnification of the display information, the visual-field frame 218A or the like displayed on the OLED display 218 is reduced and displayed by the display controller 214. As a result, the display information, such as the visual-field frame 218A, is not moved on the OVF screen 260A and is held at a position indicated by a solid line.

According to the fifth embodiment, even though the display information, such as the visual-field frame 218A, displayed on the OLED display 218 is moved (magnified or reduced), it is possible to prevent the movement of (to fix) the display information on the OVF screen 260A, and to make an imaging range to be confirmed by the user through the visual-field frame 218A coincide with an imaging range of an image to be actually recorded. Furthermore, since the display information, such as the visual-field frame 218A, displayed on the OLED display 218 is magnified or reduced, it is possible to prevent burn-in of the OLED display 218 due to the display of the visual-field frame 218A or the like.

In the fifth embodiment, although the target lens 268 is moved in the optical axis direction to change the optical magnification, the invention is not limited thereto, and the OLED display 218 may be moved in the optical axis direction of the target lens 268 to change the optical magnification.

It is preferable that the movement of the target lens 268 in the optical axis direction and the magnification or reduction of the display information, such as the visual-field frame 218A, displayed on the OLED display 218 are performed simultaneously. In this case, even when the movement is performed at any timing, since the display information, such as the visual-field frame 218A, is not moved on the OVF screen 260A, the user does not feel a sense of discomfort.

[Method of Controlling Imaging Device]

Figure 13:
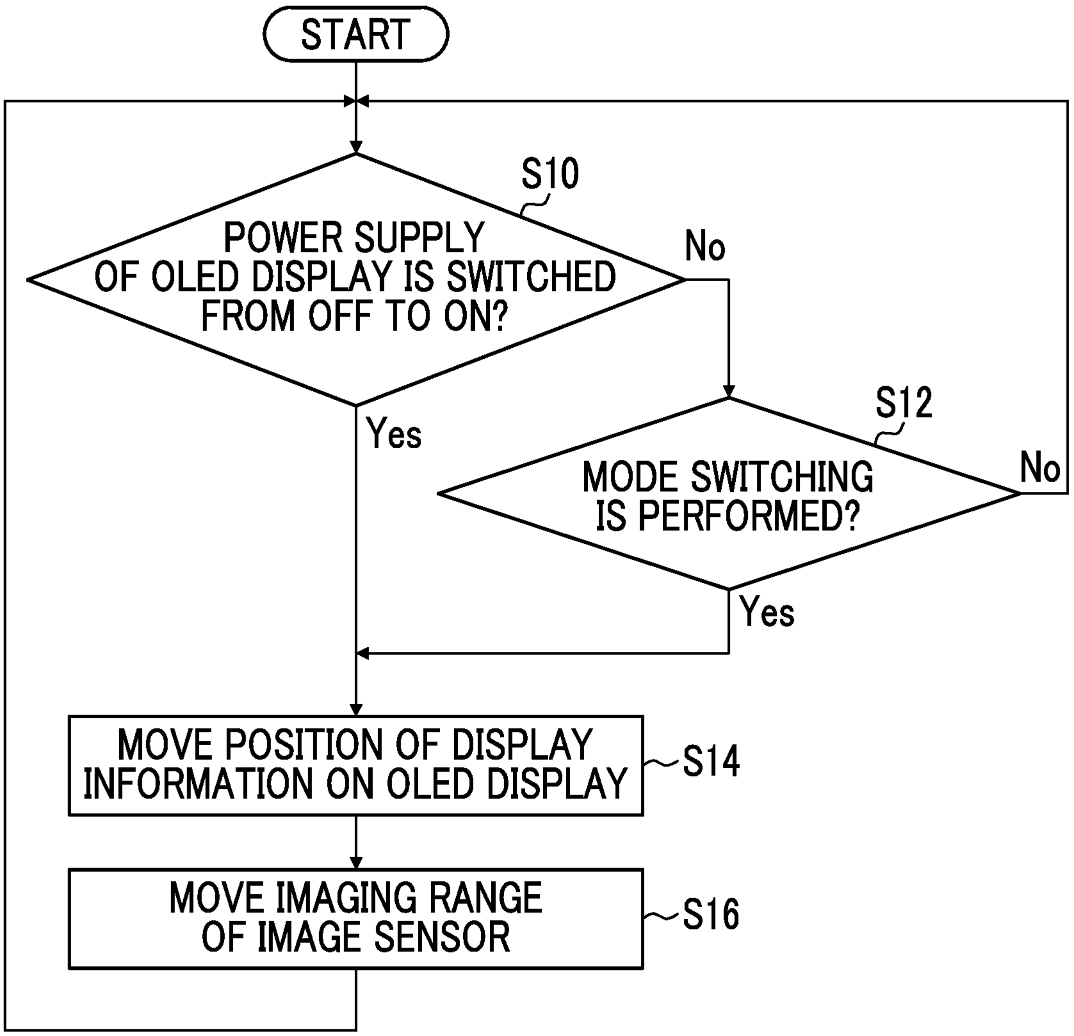
FIG. 13 is a flowchart showing a method of controlling an imaging device according to an embodiment of the invention.

FIG. 13 is a flowchart showing an embodiment of a method of controlling an imaging device according to the invention.

In FIG. 13, the body-side CPU 220 executes the control program for an imaging device stored in the ROM 228 or the like and determines whether or the power supply of the OLED display 218 is switched from OFF to ON (Step S10). For example, in a case where power is supplied by the power lever 25 or a case where the display of the OLED display 218 is switched from OFF to ON based on the detection output of the eye sensor 32, determination can be made that the power supply of the OLED display 218 is switched from OFF to ON.

In a case where determination is made that the power supply of the OLED display 218 is not switched from OFF to ON (in a case of "No"), the body-side CPU 220 transitions to Step S12 and determines whether or not switching among various modes is performed. For example, in a case where the mode is switched from the playback mode to the imaging mode or in a case where the mode transitions by the operation of the view mode button 34, determination can be made that the mode is switched.

In a case where determination is made in Step S12 that the mode is switched (in a case of "Yes"), the process transitions to Step S14, and in a case where determination is made that the mode is not switched (in a case of "No"), the process returns to Step S10.

In a case where the process transitions to Step S14, the display controller 214 moves the visual-field frame 218A and the focus frame 218B, which are displayed on the OLED display 218, on the OLED display 218 according to the control program for an imaging device. With this, it is possible to prevent burn-in of the OLED display 218 due to the continuous display of the visual-field frame 218A or the like at the same position.

Subsequently, the imaging range movement controller moves the imaging range of the image sensor 201 corresponding to the amount of movement of the visual-field frame 218A or the like on the OLED display 218 by the display controller 214 in Step S14 according to the control program for an imaging device, and thereafter, transitions the process to Step S10 (Step S16).

Then, Steps S10 to S16 are repeated, whereby each of the movement of the display information, such as the visual-field frame 218A, displayed on the OLED display 218 and the movement of the imaging range of the image sensor 201 is repeatedly executed while changing the amount of movement (including the direction of movement).

Here, as the imaging range movement controller, the sensor movement controller that moves the image sensor 201 itself in the direction perpendicular to the optical axis direction of the imaging optical system 102, the optical member movement controller that moves at least a part of optical members (in the example, the shake correction lens 106 of the vibration-proof device) of the imaging optical system 102 in the direction perpendicular to the optical axis direction of the imaging optical system 102, or the image cutout unit that controls the cutout position of the imaging pixel region to be cut out from the effective pixel region of the image sensor 201 to move the imaging range of the image sensor 201 can be used.

In a case where the power supply of the OLED display 218 is switched from OFF to ON as described above or in a case where the mode is switched, it is possible to move the visual-field frame 218A or the like on the OLED display 218 each time switching is performed, and to move the imaging range of the image sensor 201. With this, it is possible to prevent burn-in of the OLED display 218 due to the display of the visual-field frame 218A or the like, and to make an imaging range confirmable through the visual-field frame 218A after movement coincide with an imaging range, in which imaging is actually performed.

Although a case where the power supply of the OLED display 218 is switched from OFF to ON or a case where the mode is switched is an example of a specific timing of a case where the user is not looking through the OVF, the timing at which the visual-field frame 218A or the like on the OLED display 218 is moved is not limited thereto.

[Method of Controlling Finder Device]

Figure 14:
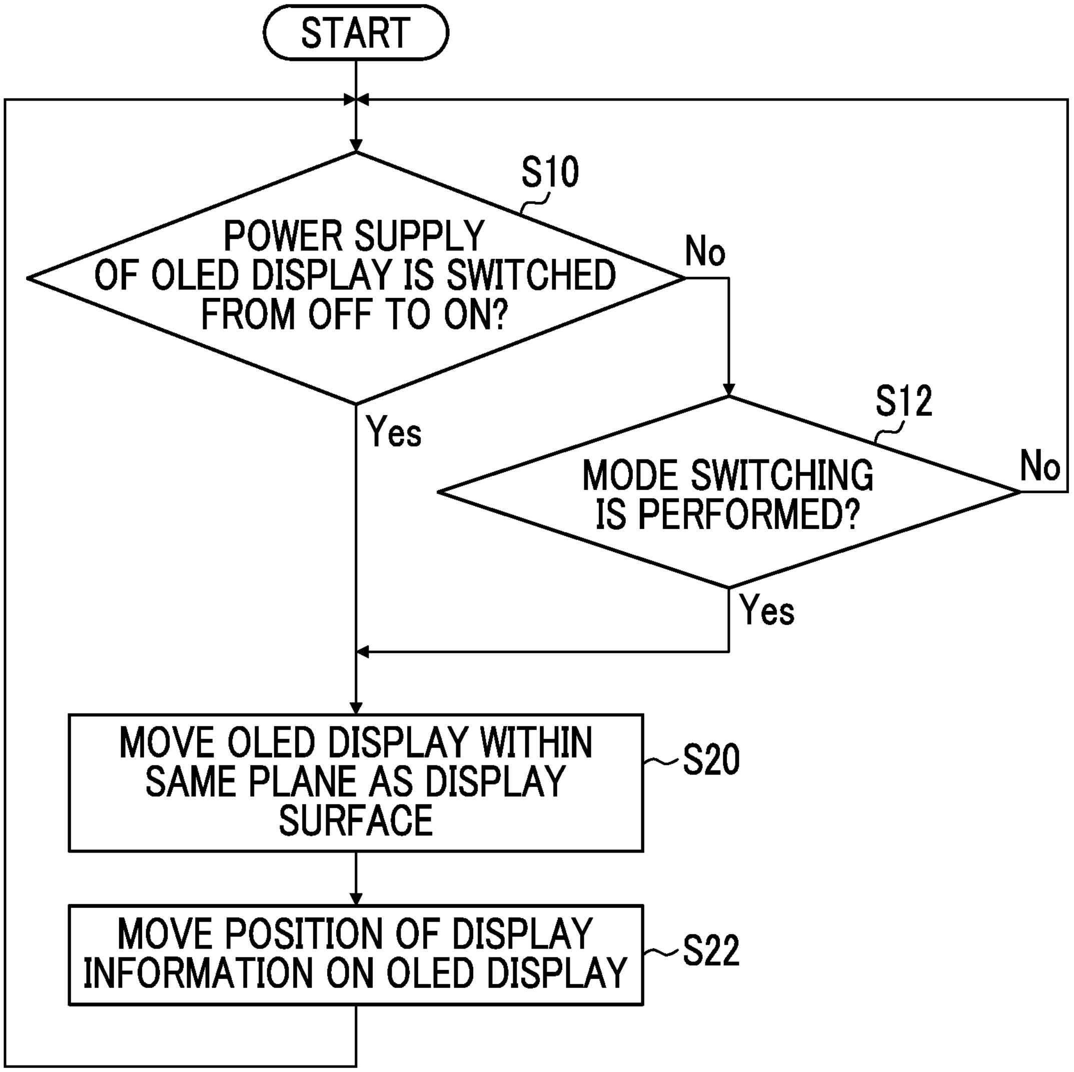
FIG. 14 is a flowchart showing a method of controlling a finder according to a first embodiment of the invention.

FIG. 14 is a flowchart showing a first embodiment of a method of controlling a finder according to the invention. The portions common to the flowchart shown in FIG. 13 are represented by the same step numbers, and detailed description thereof will not be repeated.

In FIG. 14, the display drive unit 219 (FIG. 9) moves the OLED display 218 within the same plane as the display surface of the OLED display 218 according to the control program for a finder device stored in the ROM 228 or the like (Step S20).

Subsequently, the display controller 214 moves the display information, such as the visual-field frame 218A, which is displayed on the OLED display 218, on the OLED display 218 corresponding to the movement of the OLED display 218 according to the control program for a finder device (moves so as to cancel the movement of the OLED display 218), and transitions the process to Step S10 (Step S22).

Then, Steps S10 to S22 are repeated, whereby each of the movement of the display information, such as the visual-field frame 218A, displayed on the OLED display 218 and the movement of the OLED display 218 is repeatedly executed while changing the amount of movement.

With this, it is possible to prevent burn-in of the OLED display 218 due to the display of the visual-field frame 218A or the like, and to prevent the movement of the display information, such as the visual-field frame 218A, on the OVF screen 260A.

Since the display information, such as the visual-field frame 218A, does not move on the OVF screen 260A, the movement in Steps S20 and S22 may be performed at an arbitrary timing (for example, for every given time).

Figure 15:
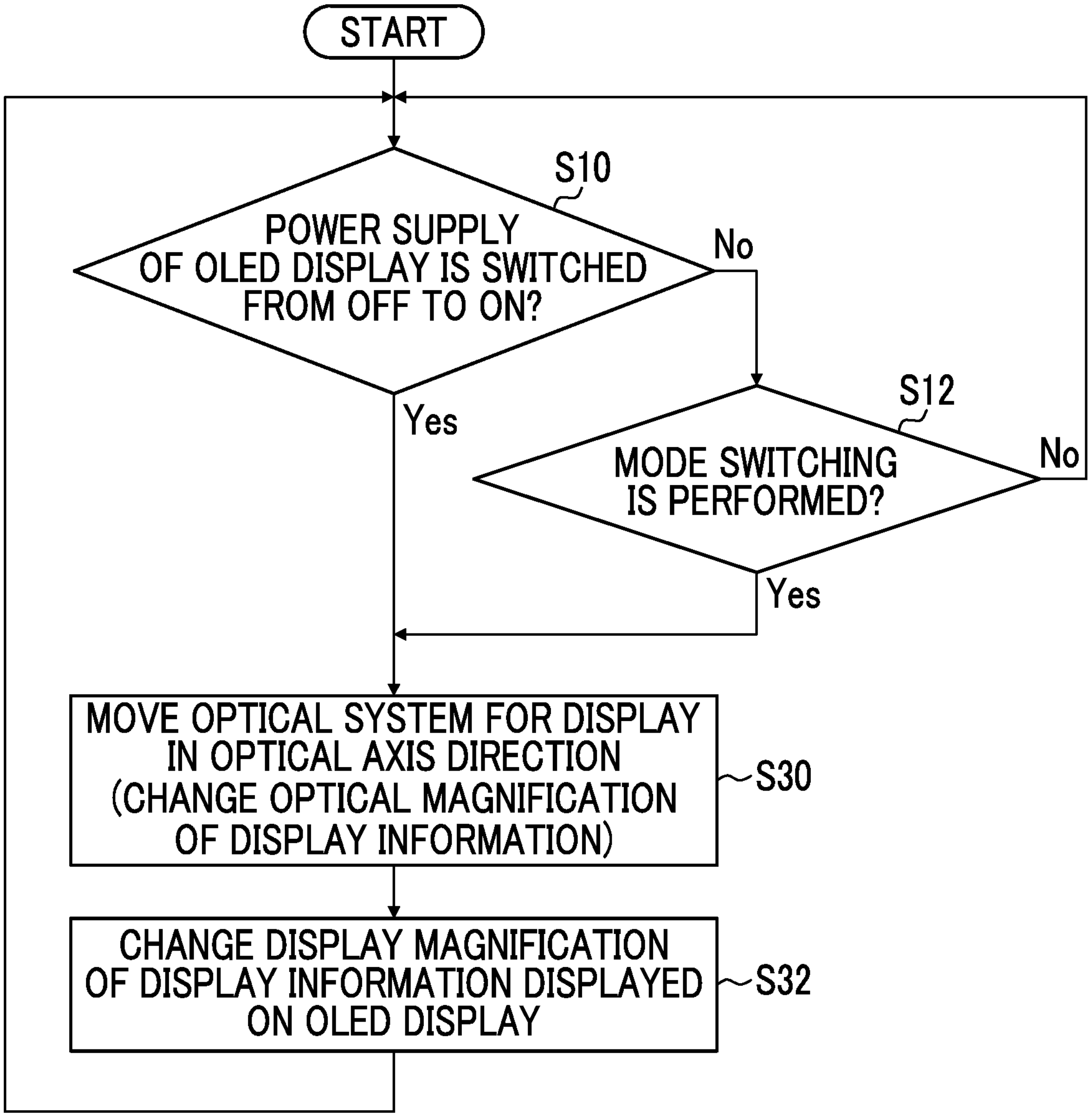
FIG. 15 is a flowchart showing a method of controlling a finder according to a second embodiment of the invention.

FIG. 15 is a flowchart showing a second embodiment of a method of controlling a finder according to the invention. The portions common to the flowchart shown in FIG. 13 are represented by the same step numbers, and detailed description thereof will not be repeated.

In FIG. 15, the lens drive unit 269 (FIG. 11) moves the target lens 268 as an optical system for display in the optical axis direction of the target lens 268 according to the control program for a finder device, and accordingly, changes the optical magnification of the display information, such as the visual-field frame 218A, displayed on the OLED display 218 (Step S30).

Subsequently, the display controller 214 magnifies or reduces the display information, such as the visual-field frame 218A, which is displayed on the OLED display 218, on the OLED display 218 corresponding to the change of the optical magnification with the movement of the target lens 268 according to the control program for a finder device (changes the display magnification so as to cancel the change of the optical magnification), and transitions the process to Step S10 (Step S32).

Then, Steps S10 to S32 are repeated, whereby each of the optical magnification and the display magnification of the display information, such as the visual-field frame 218A, displayed on the OLED display 218 is repeatedly executed while changing the magnification.

With this, it is possible to prevent burn-in of the OLED display 218 due to the display of the visual-field frame 218A or the like, and to prevent the movement of the display information, such as the visual-field frame 218A, on the OVF screen 260A.

[Other Embodiments of Imaging Device]

Figure 16:
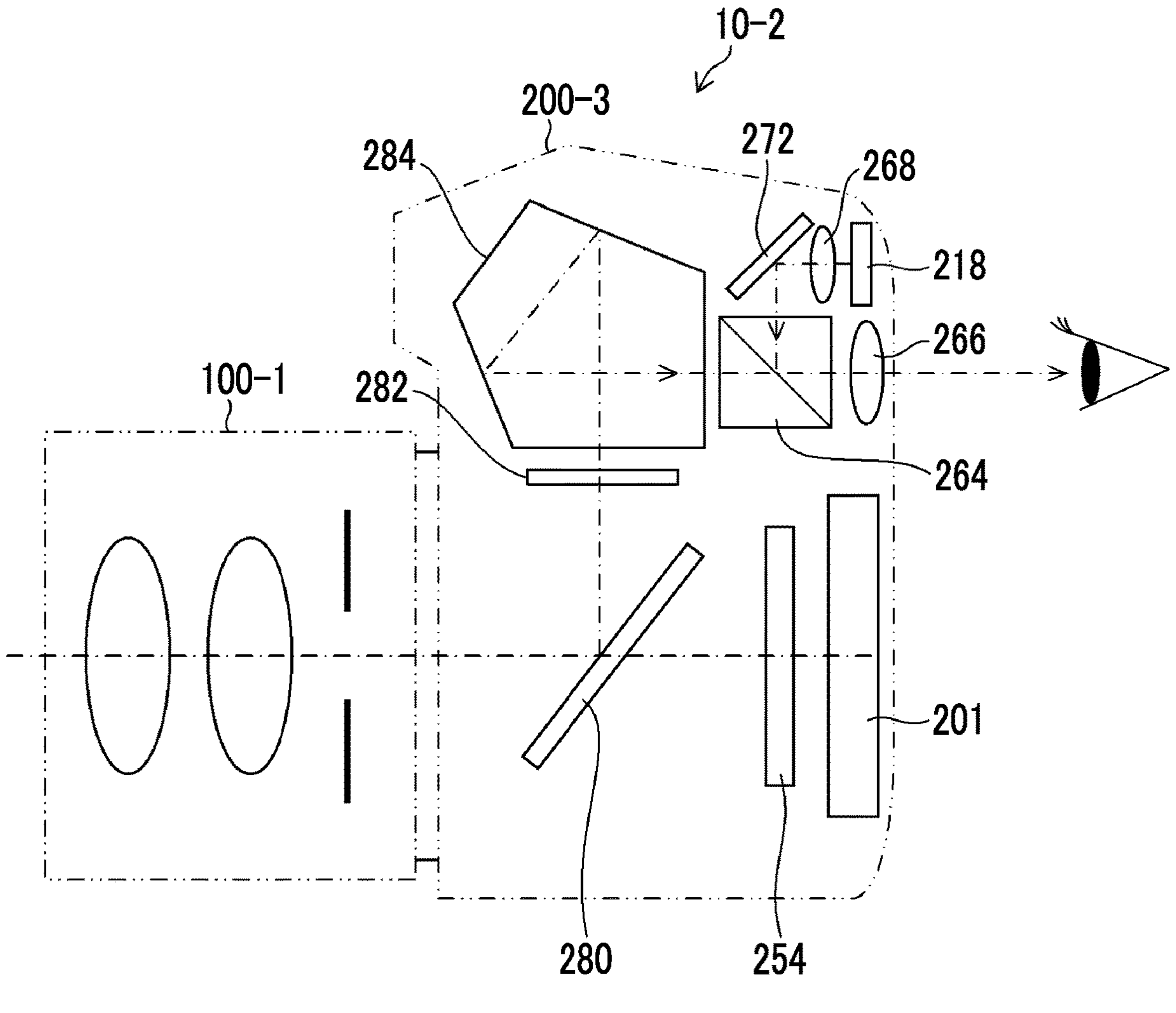
FIG. 16 is a schematic configuration diagram of a single-lens reflex camera (imaging device 10-2) to which the invention can be applied.

FIG. 16 is a schematic configuration diagram of a single-lens reflex camera (imaging device 10-2) to which the invention can be applied, and in particular, shows a single-lens reflex optical system.

The interchangeable lens 100-1 is attachable or detachable to and from a camera body 200-3 of the imaging device 10-2.

The single-lens reflex optical system shown in FIG. 16 has a known finder optical system including a quick return mirror 280, a reticle 282, a pentaprism 284, and the eyepiece lens 266. The beam splitter 264 is disposed between the pentaprism 284 and the eyepiece lens 266.

An optical image of a subject observed through a single-lens reflex type OVF is incident on one incidence surface of the beam splitter 264, and display information displayed on the OLED display 218 is incident on the other incidence surface of the beam splitter 264 through the target lens 268 and a reflection mirror 272.

The beam splitter 264 superimposes the display information displayed on the OLED display 218 on the optical image of the subject and guides the superimposed image to the eyepiece lens 266.

The FPS 254 and the image sensor 201 are disposed at the back of the quick return mirror 280.

Then, the respective embodiments of the invention can be applied in the single-lens reflex type imaging device 10-2 having the above-described configuration. For example, in a case where the first embodiment is applied, the display information displayed on the OLED display 218 is moved, and the image sensor 201 is moved corresponding to the movement of the display information, whereby burn-in of the OLED display 218 is prevented, and an imaging range confirmable through the OVF is made to coincide with an imaging range, in which imaging is actually performed.

[Others]

Since each of the finder device 260-2 of the second embodiment shown in FIG. 9 and the finder device 260-3 of the third embodiment shown in FIG. 11 can be completed only with a finder device, the finder device is not limited to a finder device that is incorporated in a camera body, and may be an external finder device that is mounted on the hot shoe 31.

Although the imaging device of the embodiment is a mirror-less digital single-lens camera or single-lens reflex camera composed of an interchangeable lens and a camera body, the imaging device may be an imaging device in which an imaging optical system is integrated with the camera body.

The display device to which the invention is applied is not limited to an OLED display, and the invention can be applied to other display devices (for example, self-luminous devices) in which the problem of burn-in occurs.

Although the finder device 260-1 shown in FIG. 3 or the like is a reverse Galileo type OVF, the finder device is not limited thereto, and may be, for example, an OVF having a different configuration, such as a real image type optical finder.

In the embodiment, for example, the hardware structures of processing unit that execute various kinds of processing, such as the display controller 214, the body-side CPU 220, and the lens-side CPU 120, are various processors described below. Various processors include a central processing unit (CPU) that is a general-purpose processor executing software (program) to function as various processing units, a programmable logic device (PLD) that is a processor capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

One processing unit may be configured of one of various processors described above or may be configured of a combination of two or more processors (for example, a plurality of FPGAs or a combination of a CPU and an FPGA) of the same type or different types. A plurality of processing units may be configured of one processor. As an example where a plurality of processing units are configured of one processor, first, as represented by a computer, such as a client or a server, there is a form in which one processor is configured of a combination of one or more CPUs and software, and the processor functions as a plurality of processing units. Secondly, as represented by system on chip (SoC) or the like, there is a form in which a processor that implements all functions of a system including a plurality of processing units into one integrated circuit (IC) chip is used. In this way, various processing units may be configured using one or more processors among various processors described above as a hardware structure.

In addition, the hardware structure of various processors is, more specifically, an electric circuit (circuitry), in which circuit elements, such as semiconductor elements, are combined.

The invention includes an imaging device having a processor, in which the processor moves display information displayed at a prescribed position of a display device on the display device and moves an imaging range of an image sensor corresponding to an amount of movement of the display information moving on the display device.

The invention is not limited to the above-described embodiments, and it is needless to say that various modifications can be made without departing from the spirit of the invention.

EXPLANATION OF REFERENCES

10, 10-2: imaging device
20: objective window
21: finder switching lever
22: shutter release switch
23: shutter speed dial
24: exposure correction dial
25: power lever
26: eyepiece window
27: MENU/OK key
28: cross key
29: playback button
30: internal flash
31: hot shoe
32: eye sensor
34: view mode button
100-1, 100-2: interchangeable lens
102: imaging optical system
104, 107: lens group
106: shake correction lens
108: stop
116, 269: lens drive unit
117, 209: vibration-proof mechanism
118: stop controller
120: lens-side CPU
122: RAM
124: ROM
126: flash ROM

150: lens-side communication unit
170, 234: camera shake detection unit
200-1, 200-2, 200-3: camera body
201: image sensor
202: image sensor controller
203: analog signal processing unit
204: A/D converter
205: image input controller
206: digital signal processing unit
207: RAM
208: compression/expansion processing unit
210: medium controller
212: memory card
214: display controller
216: liquid crystal monitor
218: OLED display
219: display drive unit
220: body-side CPU
222: operating unit
224: timepiece unit
226: flash ROM
228: ROM
230: AF controller
232: brightness detection unit
234: camera shake detection unit
236: wireless communication unit
238: GPS reception unit
240: power supply controller
242: battery
244: lens power switch
246: body-side communication unit
248: body mount
250: flash light emission unit
252: flash controller
256: FPS controller
262: objective lens
264: beam splitter
266: eyepiece lens
268: target lens
270: shutter
272: reflection mirror
280: quick return mirror
282: reticle
284: pentaprism
S10 to S32: step

What is claimed is:

1. An imaging device comprising:

an optical finder that observes an optical image of a subject;

a display;

an optical element that is disposed in an optical path of the optical finder and superimposes the optical image of the subject observed through the optical finder and display information displayed on the display;

an image sensor on which the optical image of the subject is formed through an lens system; and a processor configured to:

repeatedly and automatically move the display information displayed at a prescribed position of the display on the display while changing an amount of movement for each of the movement of the display information; and repeatedly and automatically move an imaging range of the image sensor corresponding to an amount of movement of the display information repeatedly moving on the display.

2. The imaging device according to claim 1, wherein the processor moves the image sensor in a direction perpendicular to an optical axis direction of the lens system corresponding to the amount of movement of the display information moving on the display and moves the imaging range of the image sensor.

3. The imaging device according to claim 2, further comprising:

a vibration corrector that corrects an image shake.

4. The imaging device according to claim 1, wherein the processor moves at least a part of optical members of the lens system in a direction perpendicular to an optical axis direction of the lens system corresponding to the amount of movement of the display information moving on the display and moves the imaging range of the image sensor.

5. The imaging device according to claim 4, further comprising:

a vibration corrector that corrects an image shake.

6. The imaging device according to claim 1, wherein the processor controls a cutout position of an imaging pixel region to be cut out from an effective pixel region of the image sensor corresponding to the amount of movement of the display information moving on the display and moves the imaging range of the image sensor.

7. The imaging device according to claim 1, wherein the display information displayed at the prescribed position of the display includes at least one of a visual-field frame or a focus frame.

8. The imaging device according to claim 1, wherein the display is a self-luminous display.

9. The imaging device according to claim 1, wherein the optical finder is a finder optical system independent of the lens system.

10. The imaging device according to claim 1, wherein the optical finder is a single-lens reflex optical system that observes the optical image of the subject passing through the lens system with an eyepiece unit.

11. A finder device comprising:

an optical finder that observes an optical image of a subject;

a display;

an optical element that is disposed in an optical path of the optical finder and superimposes the optical image of the subject observed through the optical finder and display information displayed on the display;

an optical system for display that is disposed between the display and the optical element; and a processor configured to:

repeatedly and automatically move the display or the optical system for display in an optical axis direction of the optical system for display and change an optical magnification of the display information viewed through an eyepiece unit of the optical finder; and repeatedly and automatically change a display magnification of the display information displayed on the display and cancel change in the optical magnification of the display information.

12. The finder device according to claim 11, wherein the display information displayed at the prescribed position of the display includes at least one of a visual-field frame or a focus frame.

13. An imaging device comprising:

the finder device according to claim 11.

14. A method of controlling an imaging device comprising an optical finder that observes an optical image of a subject, a display, an optical element that is disposed in an optical path of the optical finder and superimposes the optical image of the subject observed through the optical finder and display information displayed on the display, and an image sensor on which the optical image of the subject is formed through an lens system, the method comprising:

a step of moving the display information displayed at a prescribed position of the display on the display;

a step of moving an imaging range of the image sensor corresponding to the display information moving on the display; and a step of repeatedly and automatically executing each of the movement of the display information on the display and the movement of the imaging range while changing an amount of movement.

15. A method of controlling a finder device comprising an optical finder that observes an optical image of a subject, a display, an optical element that is disposed in an optical path of the optical finder and superimposes the optical image of the subject observed through the optical finder and display information displayed on the display, and an optical system for display that is disposed between the display and the optical element, the method comprising:

a step of moving the display or the optical system for display in an optical axis direction of the optical system for display and changing an optical magnification of the display information viewed through an eyepiece unit of the optical finder;

a step of changing a display magnification of the display information displayed on the display and cancelling change in the optical magnification of the display information; and a step of repeatedly and automatically executing each of the optical magnification of the display information and the display magnification of the display information while changing the magnification.

16. A non-transitory computer-readable recording medium in which, in a case where a command stored in the recording medium is read by a computer, the recording medium causing the computer to implement a control function for an imaging device comprising an optical finder that observes an optical image of a subject, a display, an optical element that is disposed in an optical path of the optical finder and superimposes the optical image of the subject observed through the optical finder and display information displayed on the display, and an image sensor on which the optical image of the subject is formed through an lens system, the control function causing the imaging device to execute:

a function of moving the display information displayed at a prescribed position of the display on the display;

a function of moving an imaging range of the image sensor corresponding to the display information moving on the display; and a function of repeatedly and automatically executing each of the movement of the display information on the display and the movement of the imaging range while changing an amount of movement.

17. A non-transitory computer-readable recording medium in which, in a case where a command stored in the recording medium is read by a computer, the recording medium causing the computer to implement a control function for a finder device comprising an optical finder that observes an optical image of a subject, a display, an optical element that is disposed in an optical path of the optical finder and superimposes the optical image of the subject Observed through the optical finder and display information displayed on the display, and an optical system for display that is disposed between the display and the optical element, the control function causing the finder device to execute:

a function of moving the display or the optical system for display in an optical axis direction of the optical system for display and changing an optical magnification of the display information viewed through an eyepiece unit of the optical finder;

a function of changing a display magnification of the display information displayed on the display and cancelling change in the optical magnification of the display information; and a function of repeatedly and automatically executing each of the optical magnification of the display information and the display magnification of the display information while changing the magnification.

18. An imaging device comprising:

an optical finder that observes an optical image of a subject;

a display;

an optical element that is disposed in an optical path of the optical finder and superimposes the optical image of the subject observed through the optical finder and display information displayed on the display;

an image sensor on which the optical image of the subject is formed through an lens system; and a processor configured to:

move the display information displayed at a prescribed position of the display on the display while changing an amount of movement for each of the movement of the display information every time a user is not looking through the optical finder; and move an imaging range of the image sensor corresponding to an amount of movement of the display information moving on the display.

* * * * *